US011329772B2

(12) United States Patent
Hall et al.

(10) Patent No.: US 11,329,772 B2
(45) Date of Patent: May 10, 2022

(54) REDUNDANT NETWORK SYSTEM

(71) Applicant: David R. Hall, Provo, UT (US)

(72) Inventors: David R. Hall, Provo, UT (US); Mark D. Hall, Springville, UT (US); Craig Boswell, Draper, UT (US); Jedediah Knight, Provo, UT (US)

(73) Assignee: Sure-Fi, Inc., Provo, UT (US)

( * ) Notice: Subject to any disclaimer, the term of this patent is extended or adjusted under 35 U.S.C. 154(b) by 330 days.

(21) Appl. No.: 16/007,279

(22) Filed: Jun. 13, 2018

(65) Prior Publication Data

US 2018/0294929 A1 Oct. 11, 2018

Related U.S. Application Data

(63) Continuation-in-part of application No. 15/156,663, filed on May 17, 2016, which is a continuation-in-part of application No. 15/156,729, filed on May 17, 2016.

(51) Int. Cl.
| | |
|---|---|
| *G06F 9/44* | (2018.01) |
| *H04L 1/22* | (2006.01) |
| *H04L 12/44* | (2006.01) |
| *H04L 67/12* | (2022.01) |
| *H04L 43/0817* | (2022.01) |
| *H04L 43/10* | (2022.01) |

(Continued)

(52) U.S. Cl.
CPC ............ *H04L 1/22* (2013.01); *H04L 12/2834* (2013.01); *H04L 12/44* (2013.01); *H04L 41/0668* (2013.01); *H04L 41/082* (2013.01); *H04L 43/0817* (2013.01); *H04L 43/10* (2013.01); *H04L 43/50* (2013.01); *H04L 67/12* (2013.01); *H04L 67/34* (2013.01); *H04W 88/08* (2013.01)

(58) Field of Classification Search
CPC ...................................................... H04L 1/22
USPC ................................................... 717/170
See application file for complete search history.

(56) References Cited

U.S. PATENT DOCUMENTS

| | | | | |
|---|---|---|---|---|
| 4,351,023 A | * | 9/1982 | Richer | ............... G05B 9/03 700/82 |
| 2006/0198296 A1 | * | 9/2006 | Majee | ............... H04L 1/24 370/216 |

(Continued)

OTHER PUBLICATIONS

Alena et al., Fault Tolerance in ZigBee Wireless Networks, in 2011 IEEE Aerospace Conference, Big Sky, MT (Year: 2011).*

(Continued)

*Primary Examiner* — Timothy A Mudrick

(57) ABSTRACT

A system for a redundant star network is disclosed. The system consists of a control hub, one or more backup hubs, and at least one peripheral device (PD), the peripheral device comprising a housing having at least one selectable side transparent or opaque to radio frequency (RF) transmissions while the remaining sides are opaque to RF transmissions. The control hub controls the PD, for example by controlling how the PD operates under certain conditions. The PD includes a long-range, wireless transceiver and a microcontroller, which includes instructions for periodically testing, via test signals, whether the control hub is functional. In the case that the control hub does not respond to the test signals, the PD includes instructions for switching control of the PD to the backup hub, which also stores control instructions for the PD, similar to the control hub.

18 Claims, 25 Drawing Sheets

(51) Int. Cl.
*H04L 41/082* (2022.01)
*H04L 43/50* (2022.01)
*H04L 12/28* (2006.01)
*H04L 41/0668* (2022.01)
H04W 88/08 (2009.01)
H04L 67/00 (2022.01)

(56) References Cited

U.S. PATENT DOCUMENTS

| | | | | |
|---|---|---|---|---|
| 2009/0072953 | A1* | 3/2009 | Cagno | H04B 3/544 |
| | | | | 370/228 |
| 2009/0204265 | A1* | 8/2009 | Hackett | H04L 67/12 |
| | | | | 700/284 |
| 2009/0327245 | A1* | 12/2009 | Wong | G06F 16/951 |
| 2011/0211584 | A1* | 9/2011 | Mahmoud | H04L 12/2838 |
| | | | | 370/401 |
| 2014/0362952 | A1* | 12/2014 | Cheng | H04L 27/156 |
| | | | | 375/303 |
| 2015/0081043 | A1* | 3/2015 | Kim | G05B 15/02 |
| | | | | 700/19 |
| 2016/0241988 | A1* | 8/2016 | Slevin | H04Q 9/00 |
| 2018/0279389 | A1* | 9/2018 | Kwag | H04L 49/555 |
| 2018/0294871 | A1* | 10/2018 | Kosseifi | H04W 4/026 |

OTHER PUBLICATIONS

Hwang et all., "Enhanced Self-Configuration Scheme for a Robust ZigBee-based Home Automation", in IEEE Transactions on Consumer Electronics, vol. 56, Issue 2, pp. 583-590 (Year: 2010).*

* cited by examiner

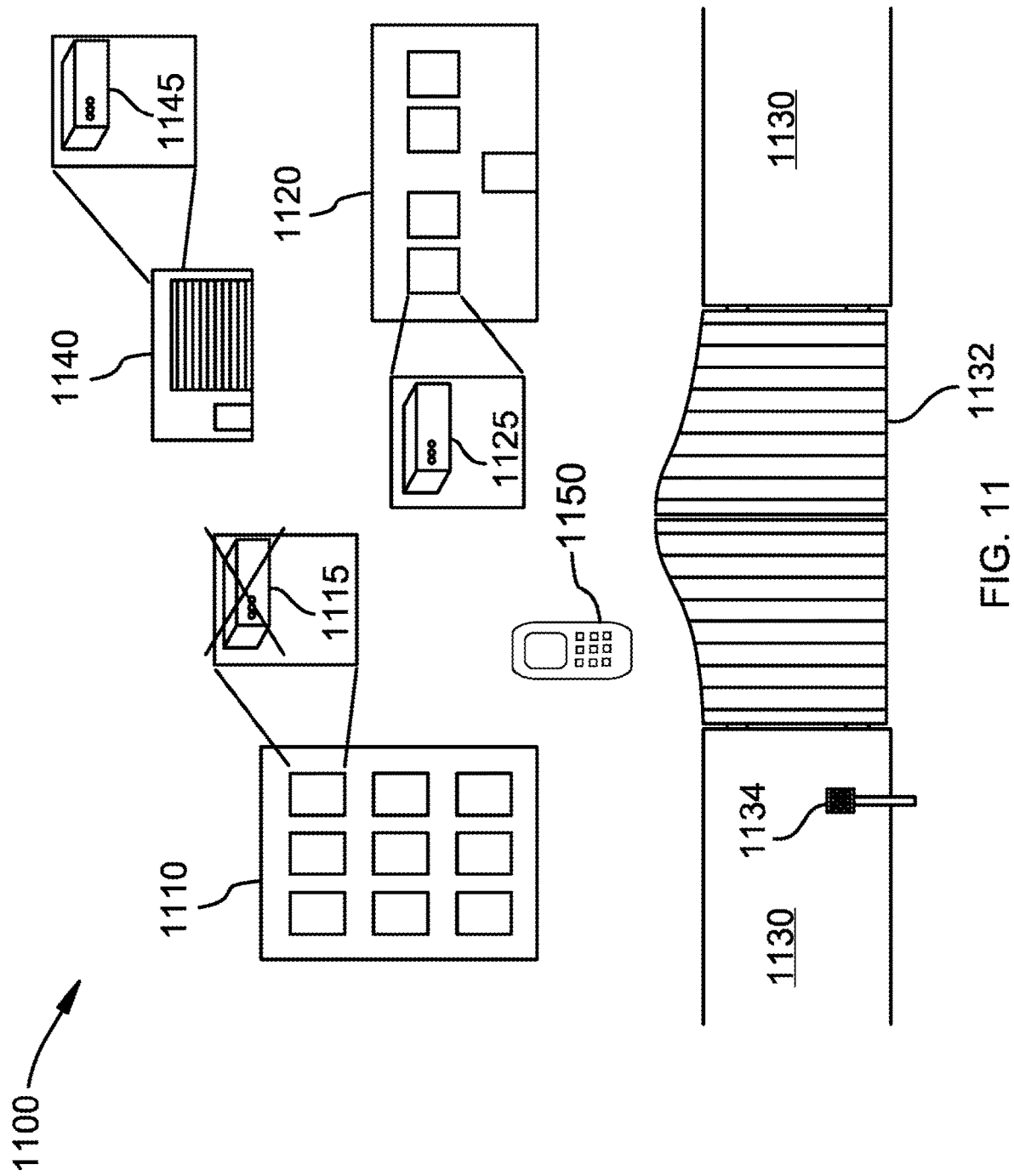

REDUNDANT NETWORK SYSTEM

CROSS-REFERENCE TO RELATED APPLICATIONS

This patent application is a continuation-in-part of U.S. Published Application No. 2017/0337049, filed May 17, 2016 and entitled Device to Hub Repair of a Redundant Star Network; and U.S. Published Application No. 2017/0339004, filed May 17, 2016 and entitled Hub to Hub Repair of a Redundant Start Network, the entire disclosures of which are incorporated herein by reference.

TECHNICAL FIELD

This invention relates generally to the internet of things, and more specifically to device control redundancy and switching.

BACKGROUND

Home and office automation is an ever-growing market focused on streamlining and simplifying user experiences at home and work. The products and services that can be included in home and office automation systems vary widely based on user need. Customizable lights, adaptive blinds and thermometers, remotely controlled entry points, smart door locks, smart refrigerators, and smart washers are just a few products available and designed with the purpose of improving the user's life while at home and work. However, these products and services are limited by the wired and wireless communication networks of which they are a part. An automated home or office is dependent on the ensured and enduring connectivity of networked devices with control hubs. When the network or control hubs fail, the user is left with the challenge of non-functioning devices.

SUMMARY

In one aspect, the invention is a redundant network system that includes a peripheral device, with a peripheral device wireless long-range transceiver and a peripheral device microcontroller. The peripheral device also has a housing with at least one selectable side transparent or opaque to radio frequency (RF) transmissions, while the remaining sides are opaque to RF transmissions. A control hub is included that has a control hub wireless long-range transceiver, one or more control hub hardware processors and control hub hardware memory that stores system operation information. The system operation information includes control instructions for controlling the peripheral device, including control instructions rendering the selectable side transparent or opaque to RF transmissions. Likewise, the control hub controls the peripheral device by executing the control instructions at the control hub hardware processors and by transmitting the control instructions to the peripheral device after rendering the selectable side transparent to RF transmissions via the control hub wireless long-range transceiver. A backup hub is also included, which has a backup hub wireless long-range transceiver, including one or more backup hub hardware processors, and backup hub hardware memory that stores the system operation information, including the control instructions rendering the selectable side transparent or opaque to RF transmissions. The peripheral device microcontroller includes control hub test firmware that instructs the peripheral device to send a test signal to the control hub, and the control hub test firmware instructs the peripheral device to listen for a test response signal indicating the control hub is operational. The system also includes update firmware that instructs the peripheral device to send a control hub switch signal to the backup hub to update the system operation information to designate the backup hub for controlling the peripheral device when the test response signal is not received within an expected response timeframe after the test signal is sent, indicating the control hub is not operational, wherein the backup hub controls the peripheral device when the control hub is not operational by executing the control instructions at the backup hub hardware processors that render the selectable side transparent or opaque to RF transmissions and transmitting the control instructions to the peripheral device via the backup hub wireless long-range transceiver.

Thus, a system for a redundant star network is disclosed that overcomes and/or improves upon the limitations discussed above. The system consists of a control hub, one or more backup hubs, and at least one peripheral device (PD), the peripheral device comprising a housing having at least one selectable side transparent or opaque to radio frequency (RF) transmissions while the remaining sides are opaque to RF transmissions. The control hub controls the PD, for example by controlling how the PD operates under certain conditions. The PD includes a long-range, wireless transceiver and a microcontroller, which includes instructions for periodically testing, via test signals, whether the control hub is functional. In the case that the control hub does not respond to the test signals, the PD includes instructions for switching control of the PD to the backup hub, which also stores control instructions for the PD, similar to the control hub.

Such redundancy allows for ensured and enduring functionality of the redundant star network. In the case of one network hub becoming non-responsive and/or non-functioning, the peripheral device will choose a backup network control hub, ensuring that the user can continue to control the peripheral device via their home automation network.

The system also includes, in some embodiments, a cloud server that is networked to the control hub and/or the backup hub. The cloud server stores the system operation information for the network, which can be accessed by a user via a smartphone, tablet, or computer. The user is notified via the server when a control hub is non-functional and/or when control for one or more PDs has switched hubs.

In one embodiment, the system includes a PD, a control hub, and a backup hub. The control hub and backup hub each have a wireless long-range transceiver, hardware processors, and hardware memory that stores system operation information. The PD includes a wireless long-range transceiver and a microcontroller. The control hub and backup hub hardware memories store system operation information for a redundant star network of which they are a part. The system operation information includes instructions for controlling the PD, including rendering the selectable side transparent or opaque to radio frequency (RF) transmissions. The control hub controls the PD by executing the control instructions at the control hub hardware processors and transmitting the executed control instructions to the PD via the control hub wireless long-range transceiver to the PD. Additionally, the PD microcontroller includes hub test firmware and update firmware, as well as firmware capable of rendering the selectable side transparent or opaque to RF transmissions. The PD test firmware instructs the PD to send a test signal designated for the control hub and to listen for a test response signal indicating the control hub is operational. The PD update firmware instructs the PD to send a control hub switch signal designated for the backup hub to update the system operation information to designate the backup hub for controlling the PD when the test response signal is not received within an expected response timeframe after the test signal is sent. The backup hub controls the PD when the control hub is not operational by executing the control instructions at the backup hub hardware processors and transmitting the executed control instructions to the PD via the backup hub wireless long-range transceiver.

In another embodiment, a redundant star network is disclosed that includes a PD, a control hub, and two or more backup hubs. The PD includes a wireless long-range transceiver and a microcontroller. The control hub has a wireless long-range transceiver, one or more hardware processors, and hardware memory that stores system operation information for the redundant star network. The system operation information includes instructions for controlling the PD, including instructions rendering the selectable side transparent or opaque to RF transmissions. The control hub controls the PD by executing the control instructions at the hardware processors and transmitting the executed control instructions to the PD via the control hub wireless long-range transceiver. The two or more backup hubs each have a wireless long-range transceiver, one or more hardware processors, and hardware memory that stores the system operation information. The PD microcontroller includes control hub test firmware, selecting firmware, and updated firmware, as well as firmware to render the selectable side transparent or opaque to RF transmissions. The test firmware instructs the PD to send a test signal designated for the control hub, and to listen for a test response signal indicating the control hub is operational. The selecting firmware instructs the PD to select one of the backup hubs to control the PD when the test response signal is not received within an expected response timeframe after the test signal is sent. The backup hub selected to control the PD is selected based on a received signal strength indication received at the PD from the backup hub, a time of flight for signals between the PD and the backup hub, or both. The update firmware instructs the PD to send a control hub switch signal designated for the selected backup hub to update the system operation information to designate the selected backup hub for controlling the PD when the test response signal is not received within an expected response timeframe after the test signal is sent, indicating the control hub is not operational. The selected backup hub controls the PD when the control hub is not operational by executing the control instructions at the selected backup hub hardware processors and transmitting the executed control instructions to the PD via the selected backup hub wireless long-range transceiver.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative, and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

FIG. 11 depicts another specific embodiment of a redundant star network such as a network for a multi-building industrial complex including several hubs and mobile and stationary peripheral devices;

DETAILED DESCRIPTION

Figure 1:
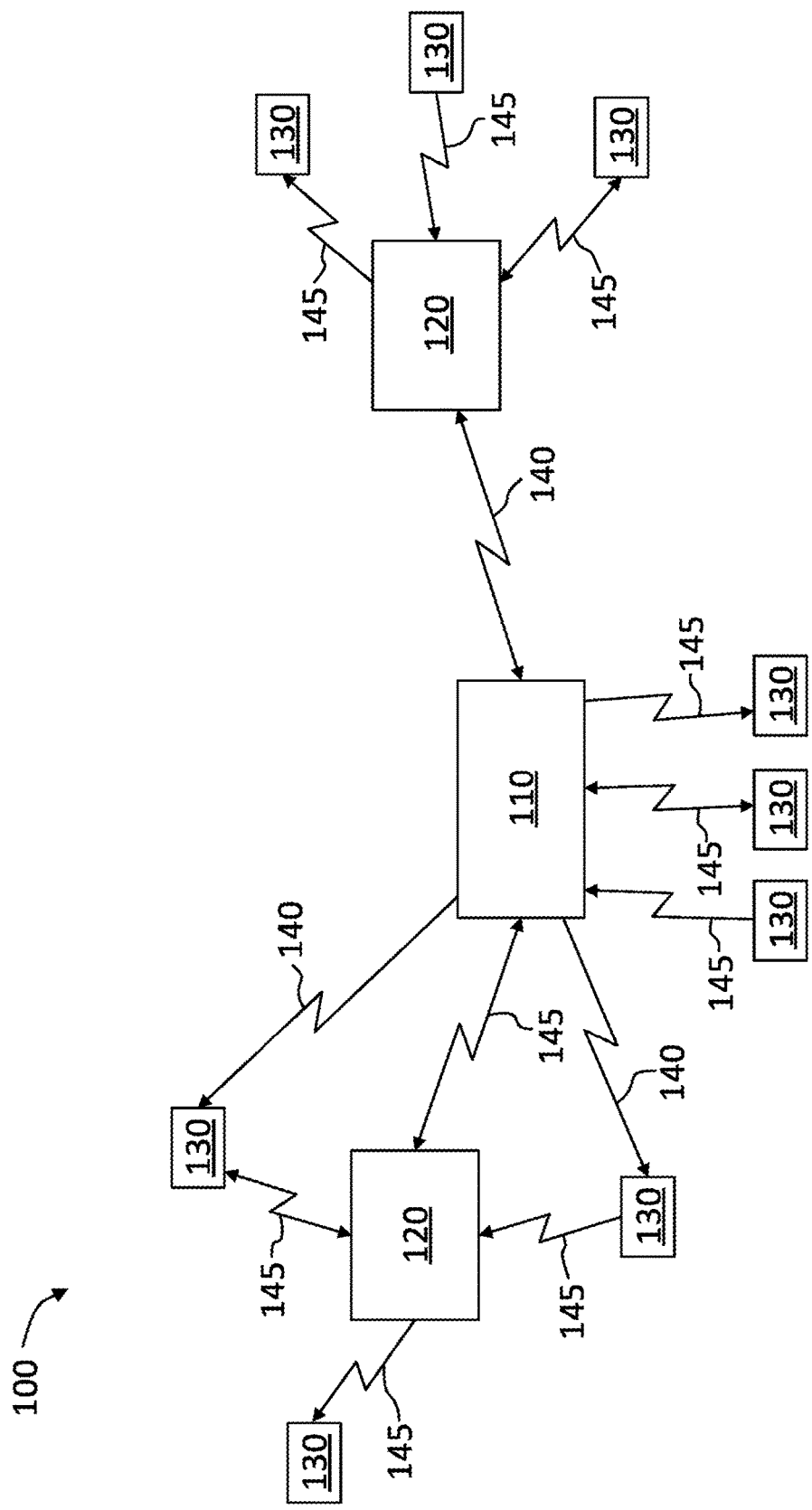
FIG. 1 depicts one embodiment of a redundant star network according to the claimed invention.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure, and are not meant to be limiting in any fashion. Nor do these phrases indicate any kind of preference for the disclosed embodiment.

Throughout this specification, reference is made to "testing" and "controlling," such as "test signals," "control signals," "test instructions," "control instructions," and the like. As used herein, "test" refers to instructions or signals that, when received by a device, elicit a test response without further action elicited from the device. For example, in some embodiments, a test signal is encoded with data bits for designating a test receive device, data bits identifying the test transmit device, and data bits for requesting a test response, in addition to other data required for the signal to be properly processed. The test response is encoded with data bits designating the test transmit device, data bits identifying the test receive device, and data bits that respond to the test response request which the test transmit device recognizes. In many such embodiments, the information transmitted is limited to the operational test, omitting control instructions that require additional power and functionality of the test receive device. In contrast to "test," as used herein "control" refers to instructions or signals the instruct a device to perform an operation. In many embodiments, a control instruction or signal does not require a response. However, in many other embodiments, a control instruction or signal requests return information. For example, in one embodiment, a hub transmits a control signal to a door access control device, instructing the door access control device to update a locally-stored table of authorized PINs. The control signal includes instructions that the door access control device respond to the control instructions confirming the table is updated, and the update instructions are completed when the door access control device transmits the response. In another embodiment, the update instructions are completed when the door access control device updates the table.

All or part of the present invention may be embodied as a system, method, and/or computer program product. The computer program product may include a computer readable storage medium (or media) having computer readable program instructions thereon for causing a processor to carry out aspects of the present invention. For example, the computer program product may include firmware programmed on a microcontroller.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, a chemical memory storage device, a quantum state storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming languages such as Smalltalk, C++ or the like, and conventional procedural programming languages such as the "C" programming language or similar programming languages. Computer program code for implementing the invention may also be written in a low-level programming language such as assembly language.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry to perform aspects of the present invention.

Aspects of the present invention are described herein with reference to flowchart illustrations and/or block diagrams of methods, apparatus (systems), and computer program products according to embodiments of the invention. Each block of the flowchart illustrations and/or block diagrams, and combinations of blocks in the flowchart illustrations and/or block diagrams, may be implemented by computer readable program instructions. Additionally, the system blocks and method flowcharts, though depicted in a certain order, may be organized in a different order and/or configuration without departing from the substance of the claimed invention.

These computer readable program instructions may be provided to a processor of a general purpose computer, special purpose computer, embedded system, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 1 depicts one embodiment of a redundant star network 100 according to the claimed invention. Redundant star network 100 includes control hub 110, one or more backup hubs 120 located remotely from control hub 110, and one or more PDs 130. PDs 130 are located remotely from control hub 110 and backup hubs 120. Control hub 110 has one or more wireless Long-range transceivers, one or more hardware processors and hardware memory that stores system operation information. The system operation information comprises instructions for controlling the PD by executing the control instructions at the hardware processor. Control hub 110 transmits the control instructions to the PDs 130 via the wireless long-range transceiver. Backup hub 120 similarly has one or more wireless Long-range transceivers, one or more hardware processors, and hardware memory that stores system operation information. PD 130 also has, in one embodiment of redundant star network 100, an actuation mechanism, at least one wireless Long-range transceiver and at least one corresponding microcontroller having communication firmware for long-range spread spectrum (SS) and/or narrowband frequency shift keying (FSK) signal communication via the PD 130 Long-range transceiver. In another embodiment, PD 130 has an actuation mechanism, at least one wireless receiver and at least one corresponding microcontroller having receive firmware for long-range SS and narrowband FSK signal communication. In yet another embodiment, PD 130 has an actuation mechanism, at least one wireless transmitter and at least on corresponding microcontroller having transmit firmware for long-range SS and narrowband FSK signal communication.

Though only a few PDs 130 are depicted, in some embodiments, redundant star network 100 includes several more PDs 130. For example, in one embodiment, control hub 110 is networked to up to 128 PDs 130. In the same and/or other embodiments, backup hub 120 is networked to up to 64 PDs 130.

As used throughout the claims and specification, long-range means any range from 0.5 to 30 miles. In some embodiments, long-range means approximately 1 mile. In other embodiments, long-range means ranging from 1 to 26 miles. In yet other embodiments, long-range means approximately 10 miles.

Control hub 110, backup hub 120, and/or PD 130 communicate via long-range SS signals 140 and/or narrowband FSK signals 145 based on a range between communicating devices. For example, in one embodiment, control hub 110 communicates with one PD 130 via long-range SS signals 140 and with a second PD 130 via narrowband FSK signals 145. In such an example, this configuration would be particularly beneficial where the first PD 130 is outside a control hub-PD narrowband FSK communication range but within a control hub-PD long-range SS communication range. In another embodiment, a PD 130 is mobile. Control hub 110 communicates with PD 130 via narrowband FSK signals 145 when PD 130 is within the control hub-PD narrowband FSK range, and via long-range SS signals 140 when PD 130 is outside the control hub-PD narrowband FSK range. In another embodiment, control hub 110 communicates with PD 130 via long-range SS signals 140 even when PD 130 is within the control hub-PD narrowband FSK range. Though not shown, in some embodiments, control hub 110 and backup hub 120 communicate via a wired connection, such as an Ethernet communication link.

Many PDs are controlled by instructions consisting of hundreds of bits to hundreds of kilobits of data. Such instructions thus do not need to be communicated over high-data rate networks, thus decreasing the power consumed in transmitting and receiving information. Rather, low-data instructions can be transmitted via a low-data rate signal while still having a fast response time, such as within one second. This is particularly important for battery-operated PDs. PD 130 is, in some embodiments, such a PD, where PD 130 is battery-operated and is controlled by instructions consisting of hundreds of bits to hundreds of thousands of bits. In one embodiment, PD 130 requires from 100 bits to 500 kilobits of data for instruction. In this embodiment, long-range SS signals 140 communicate instructions to PD 130 at a rate from 100 bits per second (bps) to 500 kilobits per second (kbps). In another embodiment, PD 130 requires from 200 bits to 300 kilobits of data for instruction. In this other embodiment, long-range SS signals 140 communicate instructions to PD 130 at a rate from 200 bps to 300 kbps. In yet another embodiment, PD 130 requires from 1 to 100 kilobits of data for instruction. In this embodiment, long-range SS signals 140 communicate instructions to PD 130 at a rate from 1 to 100 kbps.

In one example, control hub 110 communicates with backup hub 120 via long-range SS signals 140. Backup hub 120 processes communications from control hub 110 and forwards information to PD 130 via narrowband FSK signals 145. Similarly, in another embodiment, backup hub 120 receives information from control hub 110 via narrowband FSK signals 145, processes the information, and forwards information to PD 130 via long-range SS signals 140. As another example, communication between control hub 110, backup hub 120 and PD 130 is accomplished via solely long-range SS signals 140 or solely narrowband FSK signals 145.

Long-range SS signals 140 are any type of spread spectrum signal. For example, in one embodiment, long-range SS signals 140 are long-range spread spectrum frequency hopping (SSFH) signals. In another embodiment, long-range SS signals 140 are long-range direct-sequence spread spectrum (DSSS), time-hopping spread spectrum (THSS), or chirp spread spectrum (CSS) signals. Other embodiments include combinations of two or more of SSFH, DSSS, THSS, and/or CSS signals. In embodiments comprising SSFH, DSSS, THSS, and/or CSS signals, the microcontrollers described above include firmware having instructions for communicating using these signals. For example, in one embodiment, the control hub hardware memory includes instructions for long-range SSFH signal communication. In the same or another embodiment, the backup hub hardware memory similarly includes instructions for long-range SSFH signal communication. Additionally, in the same or other embodiments, the PD microcontroller firmware includes instructions for long-range SSFH signal communication. In one embodiment, the microcontroller firmware of the control hub, backup hub and PD all include instructions for long-range SSFH signal communication.

In one embodiment, each backup hub 120 is associated with a particular group of PDs 130, where each PD 130 is associated with only one backup hub 120. Control hub 110 stores high-level system operation information and instructions. The system operation information and instructions include operation instructions for backup hubs 120 and PDs 130, and information about which PD 130 is associated with which backup hub 120. Control hub 110 transmits operation information and instructions to each backup hub 120 for that hub only and its associated PDs. Backup hub 120 stores the operation information and instructions sent by control hub 110 and transmits and/or receives information, including instructions, to and/or from its associated PDs 130. Thus, control hub 110 acts as a system-wide control hub, and backup hubs 120 act as local control hubs. This embodiment allows for robust communication with many devices while avoiding the interference and lag time of a single-hub system.

PD 130 may be any of a variety of apparatuses that include an actuation mechanism. In one embodiment, PD 130 is a gate for an access-controlled enclosure. For example, the enclosure, in one embodiment, is a perimeter fence surrounding a property such as a business, home, industrial complex, prison, or other access-controlled enclosures. In another embodiment, PD 130 is a door for allowing access to a structure or room within a structure. In one embodiment, PD 130 is a climate-control device, such as an HVAC system, for adjusting heating and cooling output inside a building. In yet another embodiment, PD 130 is an automated blind system and/or a light switch and/or system of light switches. PD 130 is also, in some embodiments, any of various household appliances, such as a refrigerator, stove, oven, dishwasher, clothes washing machine, clothes dryer, toilet, bath and/or shower, and kitchen appliances. In other embodiments, PD 130 is a personal computer, a printer/scanner, a fax machine and/or a telephone.

PD 130 is also, in some embodiments, any of a variety of commercial and/or industrial equipment. For example, in one embodiment, PD 130 is an elevator. In another embodiment, PD 130 is one of a variety of manufacturing equipment, such as a conveyor belt, a pump, a sensor, a motor, and/or a 3D printer. In yet other embodiments, PD 130 is a vehicle and/or a vehicle component such as a starter or a motor. In one embodiment, PD 130 is a drone.

Redundant star network 100 is a stand-alone network that offers several benefits. First, redundant star network 100 operates independently of the Internet. Thus, control hub 110 can communicate with each backup hub 120 and PD 130 even when an external Internet connection is down. Additionally, in some embodiments of redundant star network 100, control hub 110, backup hubs 120 and PDs 130 are equipped with backup power. The backup power is, in some embodiments, local, such as a battery. In the same or other embodiments, the backup power is an off-grid power source such as a generator or batteries. In such embodiments, connectivity between control hub 110, backup hubs 120 and PDs 130, and operability of each, continues through a grid-power outage.

An additional benefit of the stand-alone dual modulation network described above is inherent security. In order for a device to interpret a long-range SS signal, it must know which frequencies to check. In redundant star network 100, each of control hub 110, backup hubs 120 and PDs 130 are programmed with a unique frequency sequence for redundant star network 100. External observers not aware of the unique frequency sequence would interpret the signals from redundant star network 100 as noise, even if the observer were trying to intercept signals from redundant star network 100. For added security, control hub 110, backup hubs 120 and PDs 130 include, in some embodiments, tamper firmware that notifies an authorized user that the device has been tampered with before an unauthorized user can obtain the frequency sequence, automatically changes the frequency sequence, and updates other devices on the network with the new frequency sequence. For example, control hub 110 receives a tamper signal from PD 130. Control hub 110 changes the frequency sequence and updates backup hubs 120 and other PDs 130 with the new sequence. Control hub 110 then notifies an authorized user that PD 130 has been tampered with and the frequency sequence has been updated.

The foregoing PD 130 embodiments described are examples only, and are not to be construed as limiting the scope of PD 130. Rather, PD 130 is any device or system that includes an actuation mechanism that performs a tangible function, such as turning a light in a room on or off, unlocking and/or opening a gate, and opening and/or closing blinds.

Figure 2A:
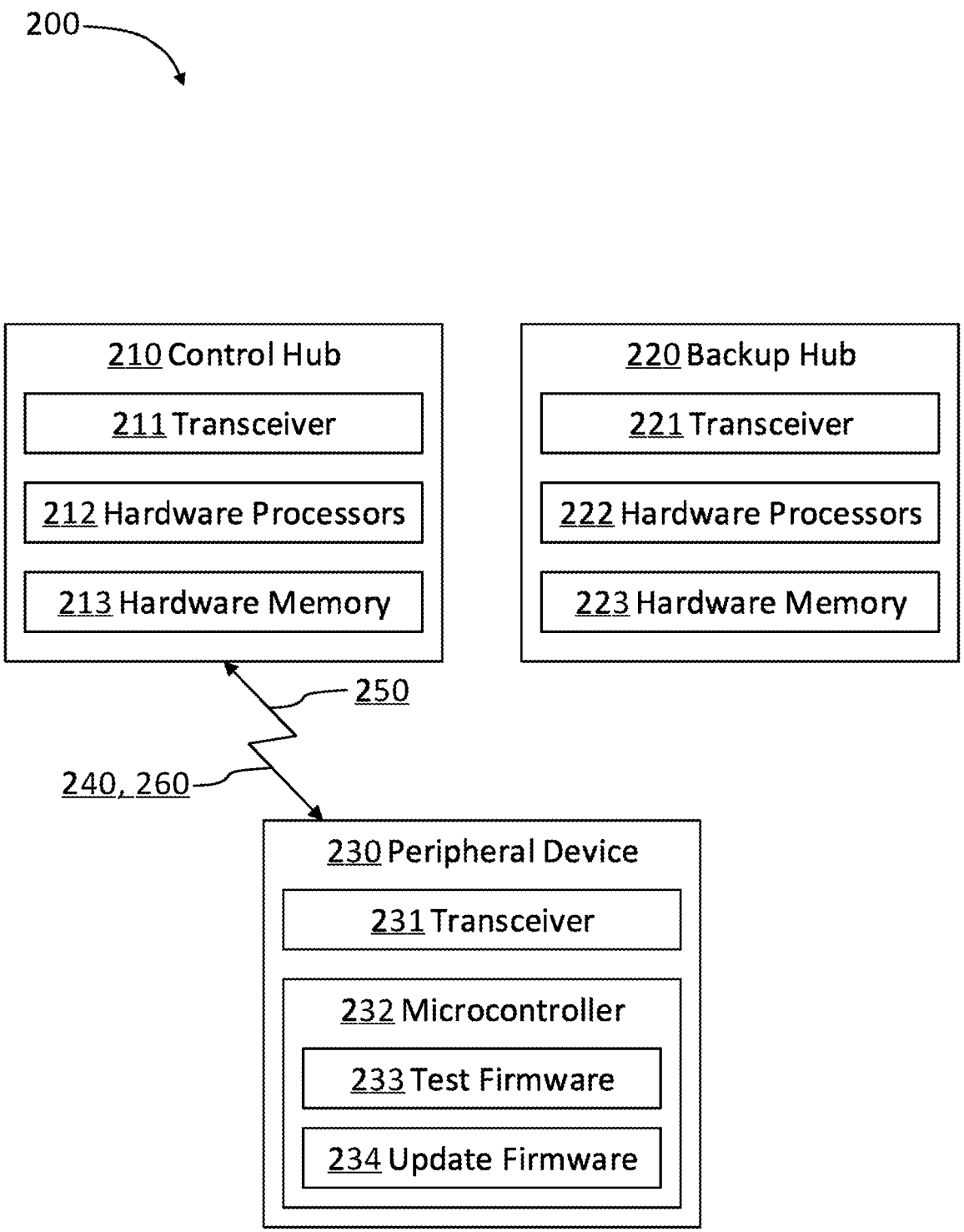
FIGS. 2A-C depict another embodiment of a redundant star network.
Figure 2B:
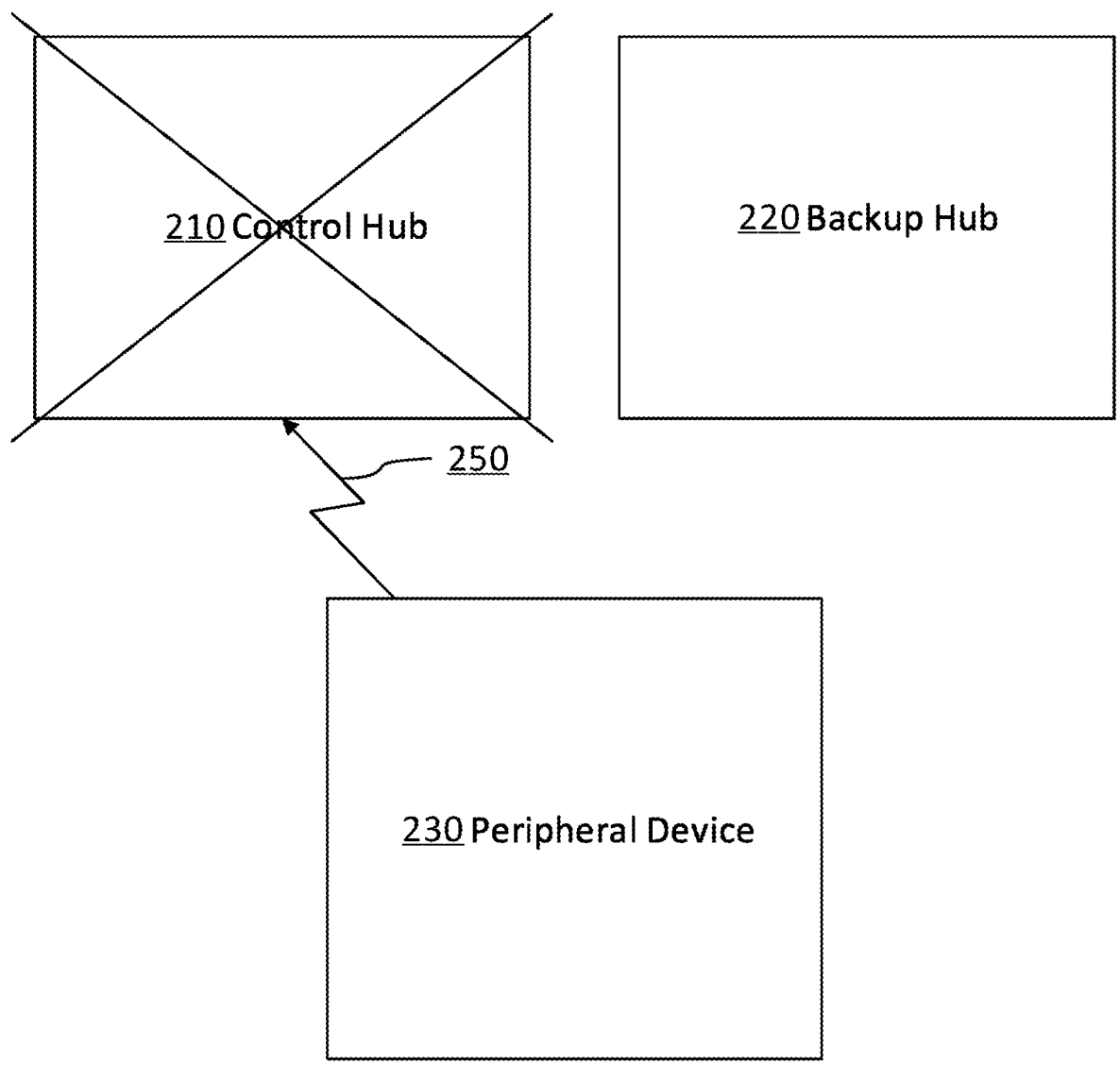
Figure 2C:
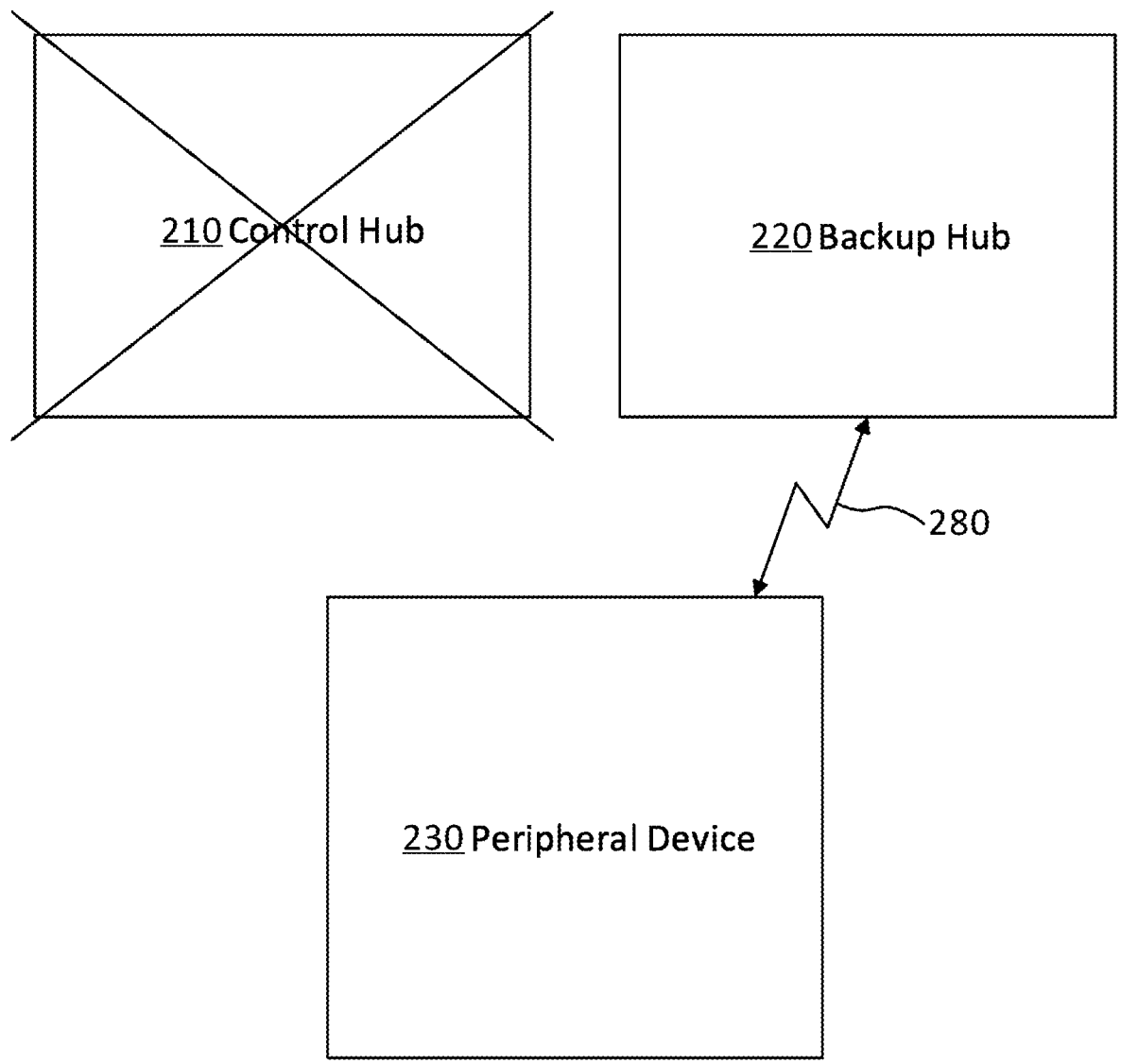

FIGS. 2A-C depict another embodiment of a redundant star network, such as redundant star network 200. As depicted in FIG. 2A, redundant star network 200 includes control hub (CH) 210, backup hub (BH) 220, and PD 230. Though only one PD 230 is depicted, redundant star network 200 includes, in some embodiments several PDs 230, similar to that described with regard to FIG. 1. PD 230 has a wireless long-range transceiver 231 and microcontroller 232. PD's 230 microcontroller 232 includes system operation information. Additionally, PD 230 is controlled wirelessly by a PD control hub. In the depicted embodiment, CH 210 controls PD 230 via wireless signals 240. Control hub 210 includes wireless long-range transceiver 211, one or more hardware processors 212, and hardware memory 213. Hardware memory 213 stores system operation information for redundant start network 200. The system operation information includes instructions for operating PD 210. Similarly, backup hub 220 includes wireless long-range transceiver 221, hardware processor 222, and hardware memory 223 that stores the system operation information.

In some embodiments, one or more of hardware memory 212, hardware memory 222, or microcontroller 232 include instructions for communicating long-range spread spectrum signals, narrowband frequency shift keying signals, or both, as described above with regard to FIG. 1.

Microcontroller 232 includes test firmware 233 and update firmware 234. Test firmware 233 instructs the PD 230 to send a test signal designated for CH 210 and instructs the PD 230 to listen for a test response signal indicating that the CH 210 is operational. Update firmware 234 instructs microcontroller 232 to send a control hub switch signal, designating BH 220 for controlling the PD 230 when test response signal is not received within the expected timeframe, indicating that CH 210 is not operational. BH 220 controls the PD 230 when CH 210 is not operational by executing the control instructions at the hardware processor 222. BH 220 transmits executed control instructions to PD 230 via the BH 220 wireless long-range transceiver 221.

The redundancy between CH 210 and BH 20 allows for continuous control of PDs, such as PD 230, even when one hub goes down. For example, in the depicted embodiment, CH 210 is the PD control hub. Periodically, PD 230 sends test signals 250 to first control hub 221. For example, in some embodiments, PD 230 sends test signals 250 to CH 220 every 1 to 5 seconds. In some embodiments, PD 230 sends test signals 250 to first CH 210 every 100 nanoseconds to 1 second. In some embodiments, PD 230 sends test signals 250 to CH 210 when a user prompts PD 230 to send test signals 250. When it is operational, CH 210 sends test response signals 260 to PD 230. Upon receiving test response signals 260, PD 230 prevents execution of update firmware 234.

FIG. 2B depicts an embodiment where CH 210 becomes non-operational. In such an embodiment, the PD 230 sends test signals 250 to CH 210, but CH 210 fails to send test response signals 260. As depicted in FIG. 2C, PD 230 executes the update firmware instructions and sends a control hub switch signal 280 designated for BH 220. Control hub switch signal 280 instructs BD 220 to update the system operation information to designate BH 220 for controlling PD 230. When the system operation information is updated, BH 220 controls PD 230.

Figure 3A:
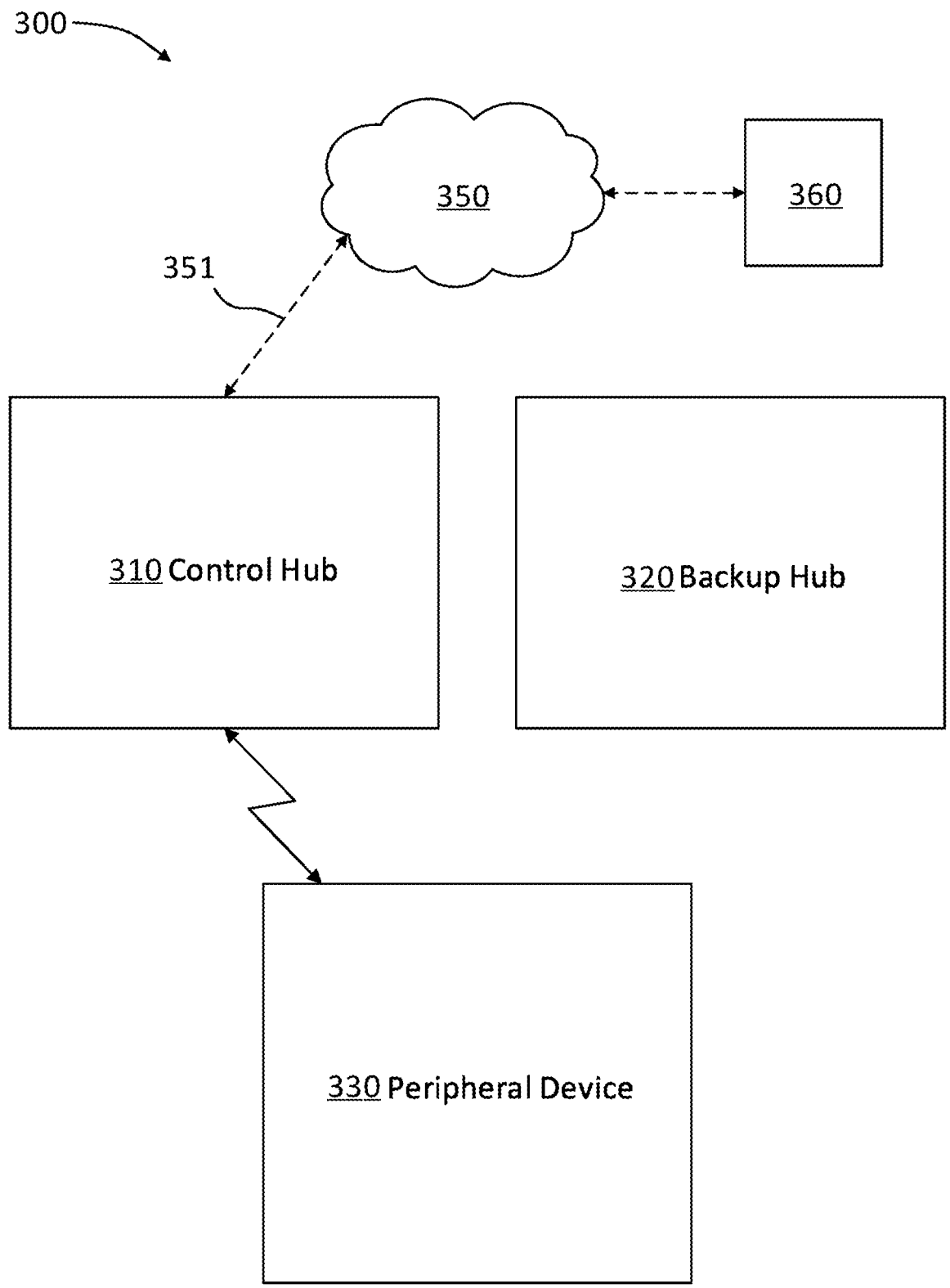
FIGS. 3A-C depict a redundant star network connected to an external cloud server for monitoring and control of the network.
Figure 3B:
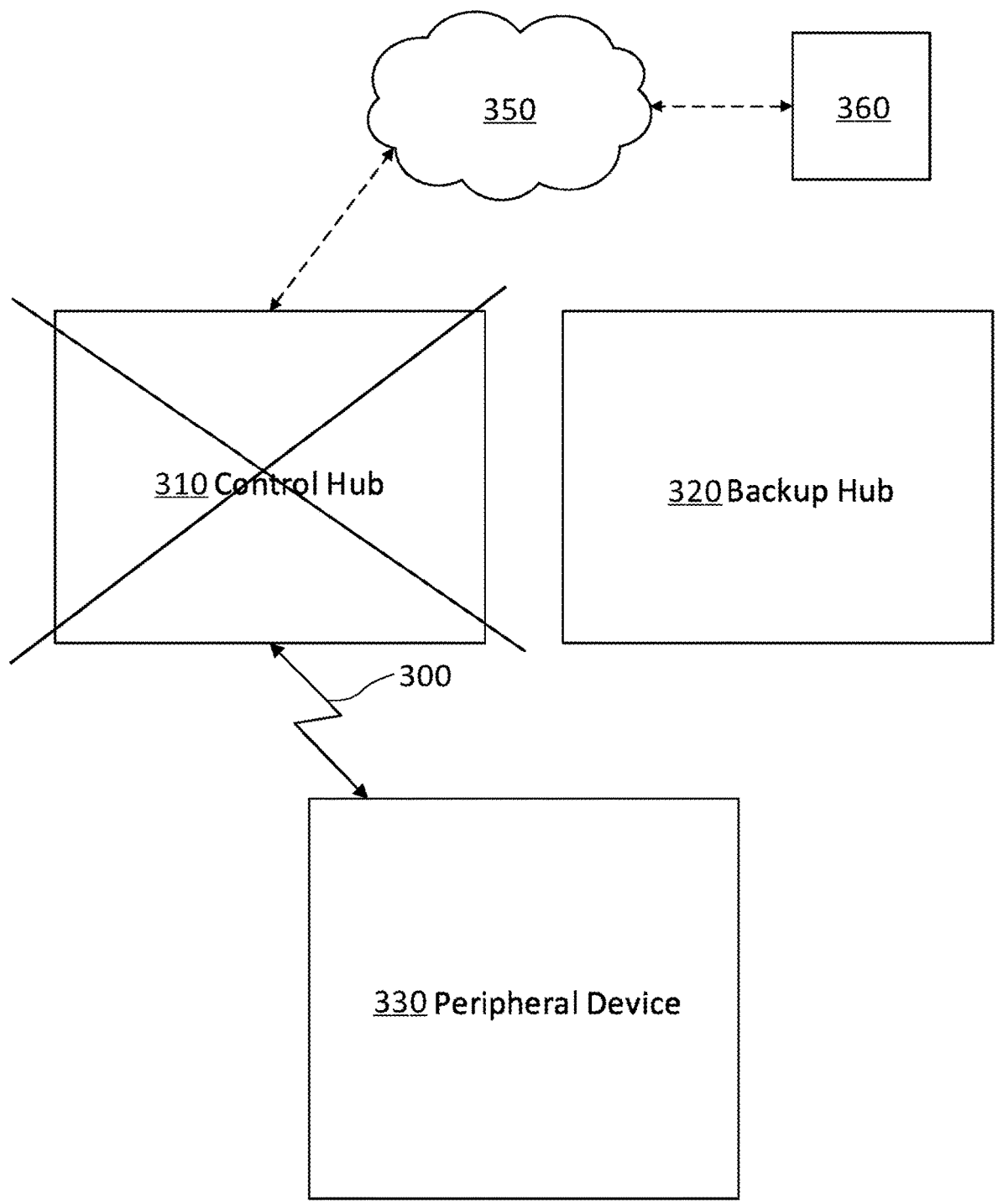
Figure 3C:
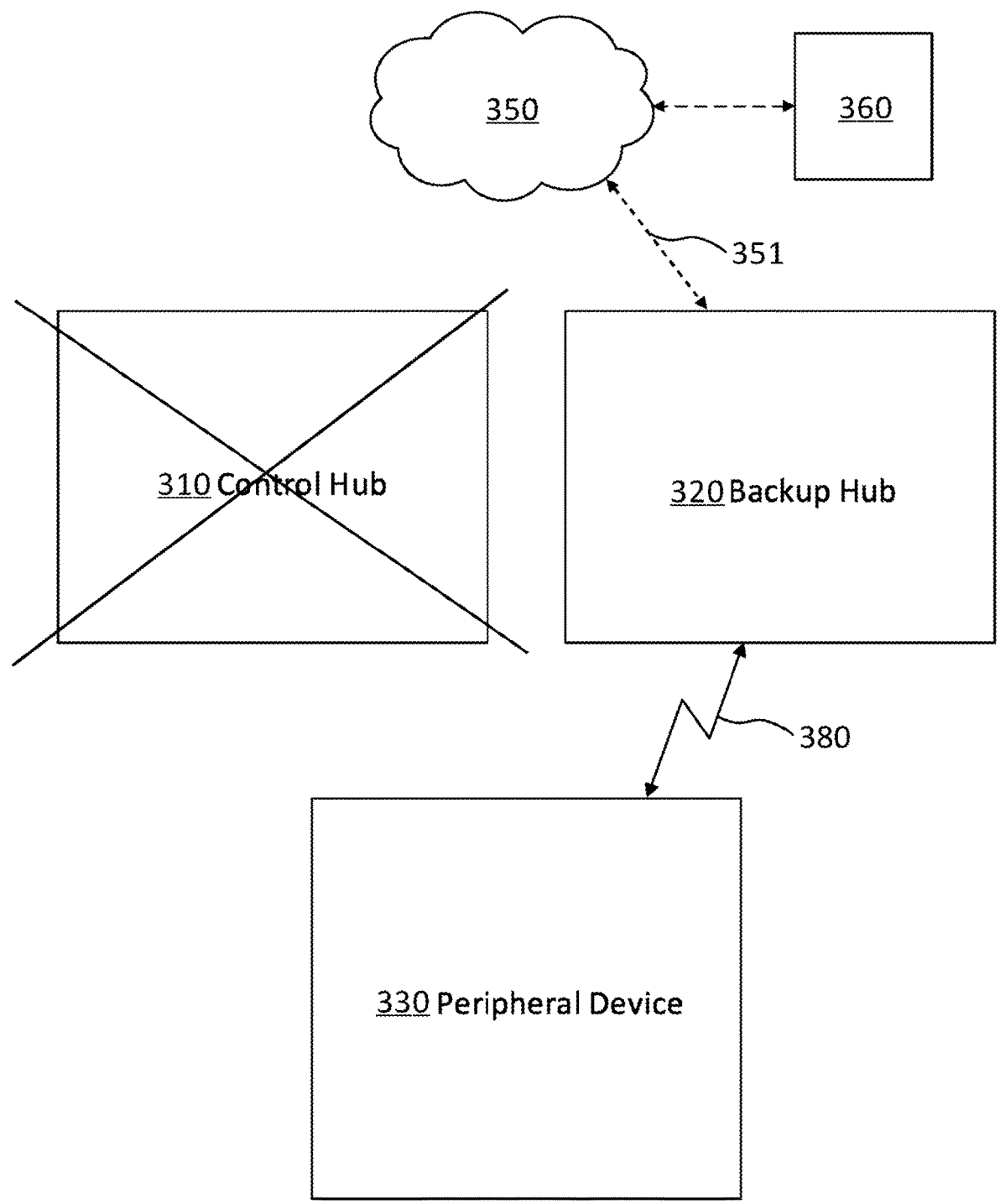

FIGS. 3A-C depict a redundant star network connected to an external cloud server for monitoring and control of the network. As depicted in FIG. 3A, redundant star network 300 includes CH 310, BH 320, and PD 330, each similar to the CH, BH and PD described above with regard to FIGS. 2A-C, respectively. Additionally, redundant star network 300 includes server 350 and user device 360. Server 350 is one among a cloud of servers, and is networked to the control hub 310 and/or backup hub 320 (though not depicted) via wired network connection 351. Though not shown, server 350 includes hardware memory that stores the system operation information. The system operation information includes instructions that instruct BH 320 to notify server 350 the test response is not received and BH 320 is designated as the PD 330 control hub. The system operation information also includes instructions that instruct server 350 to notify a user via user device 360 the test response is not received, and to notify the user via user device 360 that BH 320 is designated as the PD 330 control hub. In some embodiments, the system operation information further includes instructions that instruct CH 310 to reacquire control of PD 330 when CH 310 becomes operational and when BH 320 controls PD 320.

FIG. 3B depicts an embodiment where CH 310 becomes non-operational. In such an embodiment, PD 330 sends test signals 370 to CH 310, but CH 310 fails to send test response signals. Additionally, in some embodiments, CH 310 stops communicating with server 350. As depicted in FIG. 3C, executes the update firmware instructions and sends a control hub switch signal 380 designated for BH 320. Control hub switch signal 380 instructs BD 320 to update the system operation information to designate BH 320 for controlling PD 330. When the system operation information is updated, BH 320 controls PD 330. BH 320 communicates a failed test notice to server 350 and an updated control status to server 350 via wired connection 351 and, in some embodiments, server 350 forwards the failed test notice and updated control status to user device 360. In some embodiments, server 350 forwards the failed test notice and updated control status when user device 360 requests such information.

Figure 4A:
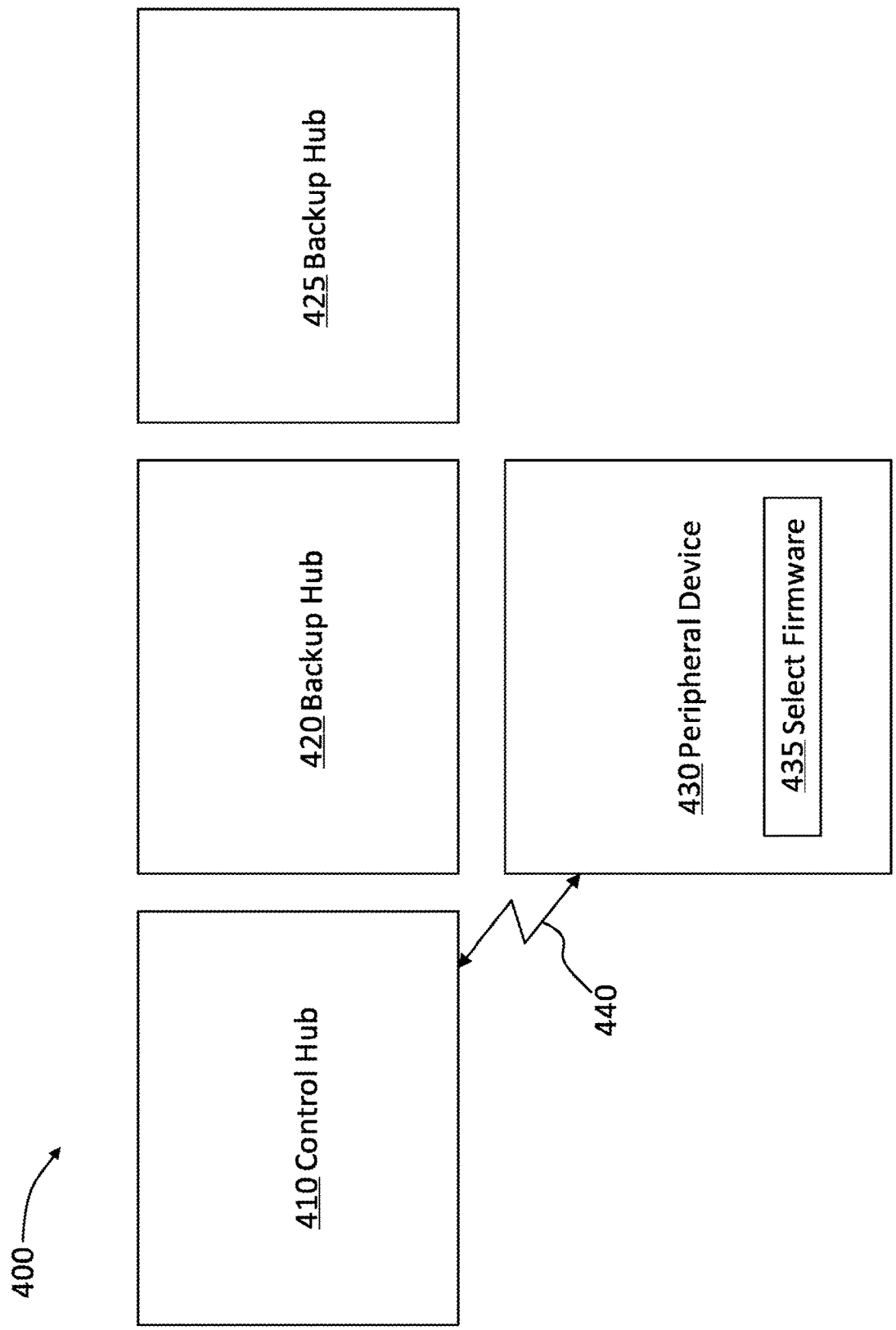
FIGS. 4A-D depict an embodiment of a redundant star network having a control hub and two or more backup hubs.

FIGS. 4A-D depict an embodiment of a redundant star network having a control hub and two or more backup hubs. As depicted in FIG. 4A, redundant star network 400 includes CH 410, two BHs 420, 425, and PD 430. Though only on PD 430 is depicted, redundant star network 400 includes, in some embodiments, several PDs 430, similar to as described with regard to FIG. 1. Additionally, though only two are depicted, in some embodiments, redundant start network 400 includes more than two backup hubs 420, 425. CH 410, BHs 420, 425, and PD 430 are similar to the CH, BH, and PD described above with regard to FIGS. 2A-C. PD 430 is controlled wirelessly by a PD control hub. For example, as depicted, PD 430 is controlled by CH 410 via wireless control signals 440.

In the embodiment depicted in FIG. 4A, PD 430 also includes selecting firmware 435. Selecting firmware 435 instructs PD 430 to select one of the BHs 420, 425 to control PD 430 with the test response signal is not received within an expected response timeframe after the test signal is sent. A new PD control hub is selected from among BHs 420, 425, in some embodiments, based on a received signal strength indication received at the PD from BHs 420, 425, a time of flight for signals between PD 430 and BHs 420, 425, or both.

Setting up a system to include multiple backup hubs provides several benefits. First, each backup hub can control multiple separate PDs, providing a larger number of PDs that can be included in the system. Second, multiple backup hubs provide multiple redundancies for ensured functionality of the PDs. Multiple backup hubs also allow a PD to select the backup hub with the strongest signal as the designated control hub until such time as the control hub becomes operational. These and additional benefits not discussed, but inherent in the system, will be recognized by one of skill in the art.

Figure 4B:
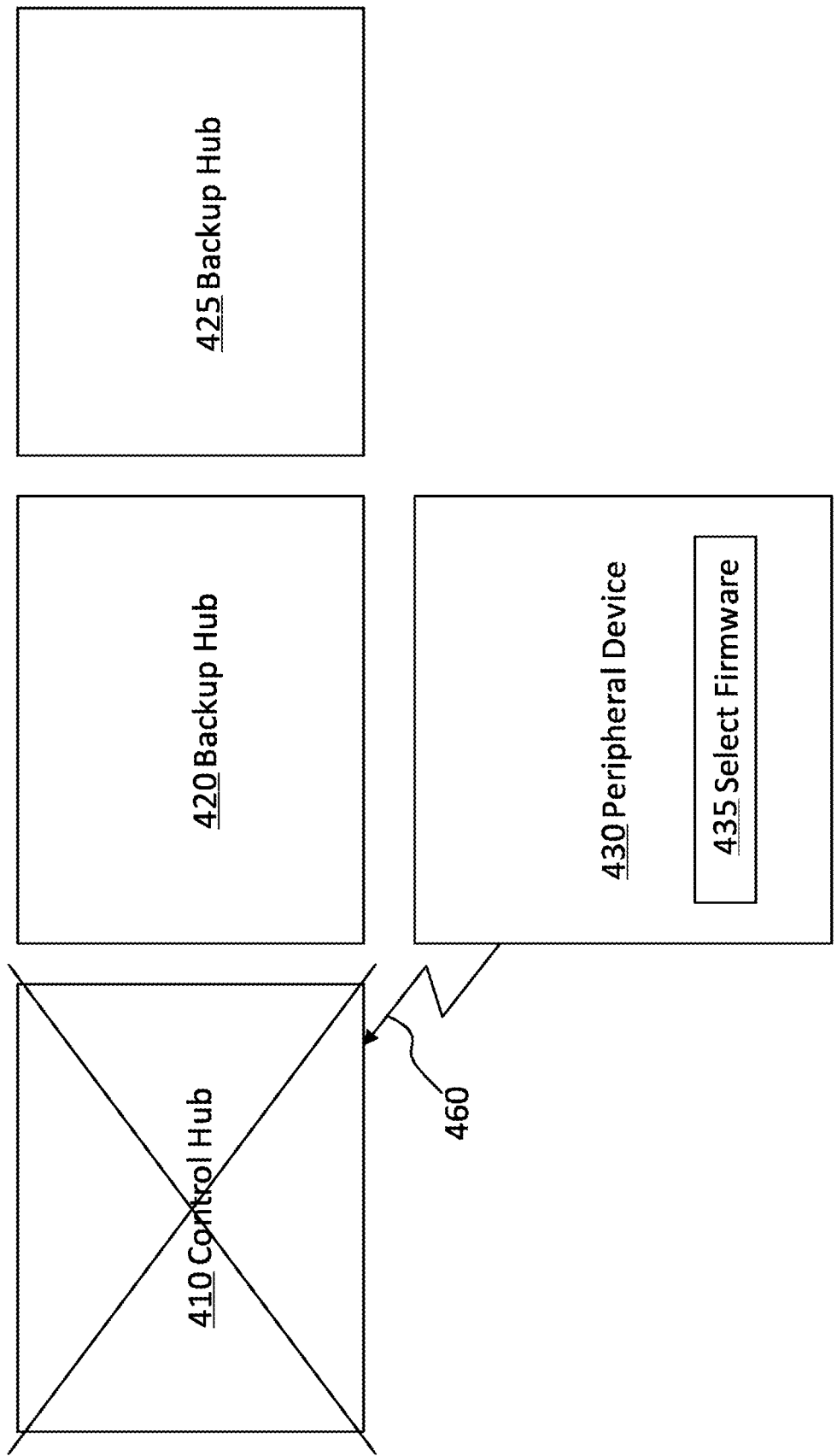
Figure 4C:
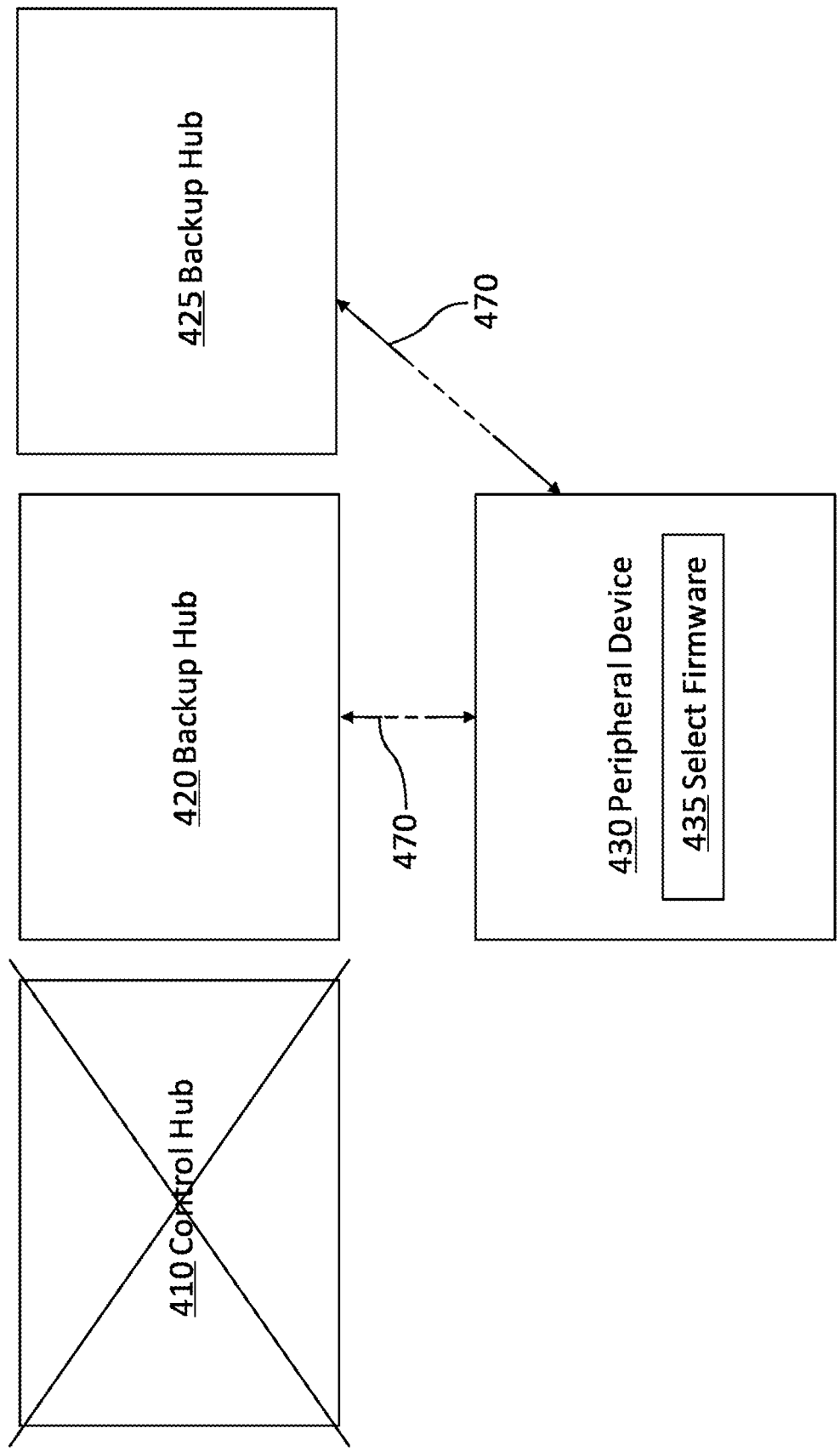
Figure 4D:
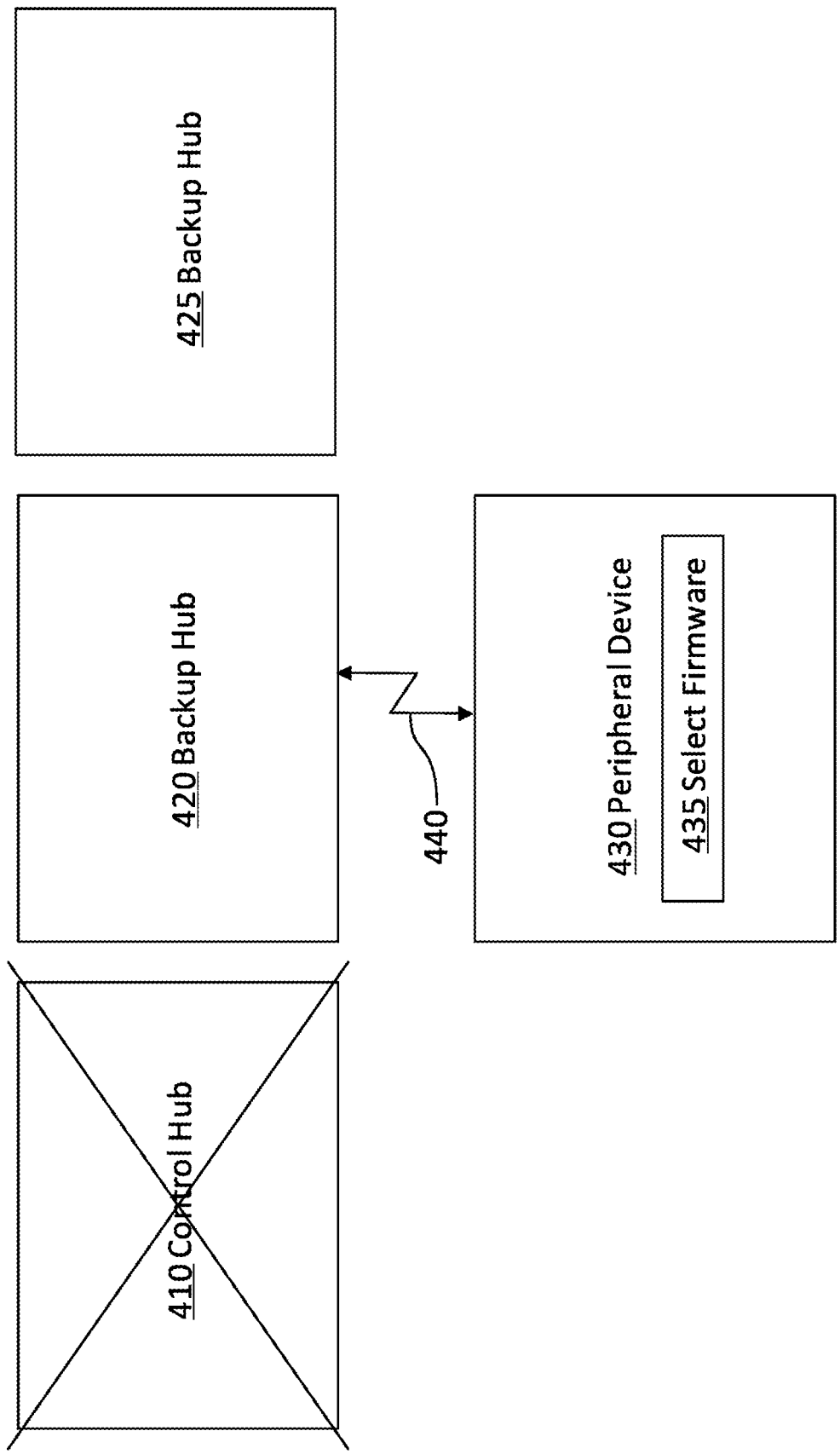

FIG. 4B depicts an embodiment where CH 410, which is the PD control hub, is non-operational. In such an embodiment, PD 430 sends test signals 460 to CH 410, and CH 410 fails to send test response signals. As depicted in FIG. 4C, PD 430 executes selecting firmware 435 to select one of BHs 420, 425 to control PD 430. PD 430 transmits signal test signals 470 to test a received signal strength indication (RSSI) and/or a time of flight between PD 430 and BHs. 420, 425. In some embodiments, selecting firmware 435 includes instructions to select as the new PD control hub the BH with the strongest RSSI. In other embodiments, selecting firmware 435 includes instructions to select as the new PD control hub the BH with the shortest time of flight. In yet other embodiments, selecting firmware 435 uses a combination of RSSI and time of flight to select the BH as the new PD control hub. Once selected, PD 430 sends a control hub switch signal designated for the selected BH to update the system operation information to designate the selected BH for controlling PD 430. As depicted in FIG. 4D, when the system operation information is updated, BH 420 controls PD 430 via control signals 440.

Figure 5A:
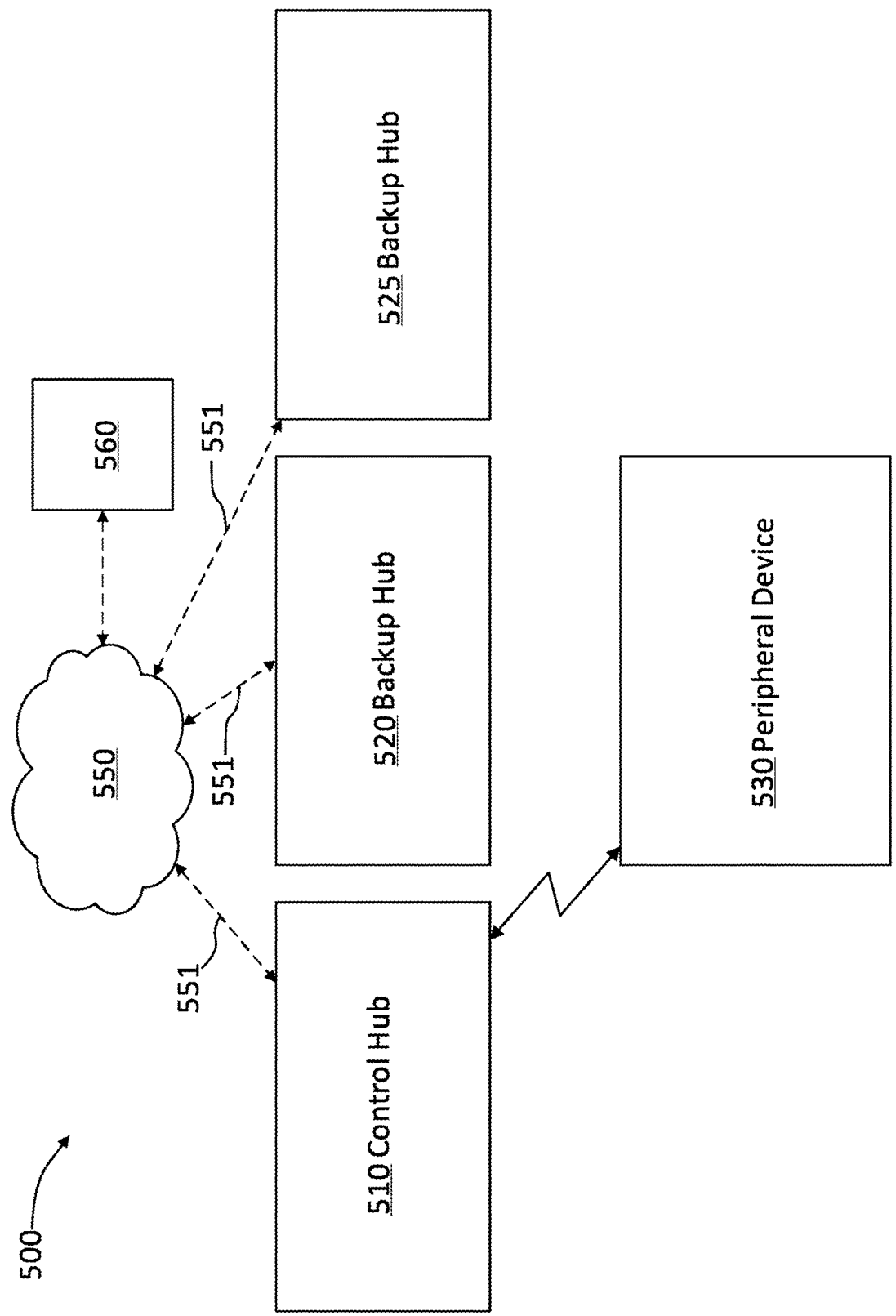
FIGS. 5A-D depict a redundant star network connected to a cloud server and user device.

FIGS. 5A-D depict a redundant star network connected to a cloud server and user device. As depicted in FIG. 5A, redundant star network 500 includes CH 510, BHs 520, 525, and PD 530. Additionally, redundant star network 500 includes server 550 and user device 560. Server 550 is one among a cloud of servers, and is networked to CH 510, and one or more of BHs 520, 525 via wired network connection 551. Though not shown, server 550 includes hardware memory that stores the system operation information. The system operation information includes instructions that instruct the selected BH, as described with regard to FIG. 4B, to notify server 550 the current PD control hub test response is not received, the selected BH is selected by the PD to control the PD, and the selected BH is designated in the system operation information to control the PD. The system operation information also includes instructions that instruct server 550 to notify a user via user device 560 the current PD control hub test response is not received, the selected BH is selected by the PD to control the PD, and selected BH is designated in the system operation information to control the PD. In some embodiments, the system operation information further includes instructions that instruct CH 510 to reacquire control of PD 530 when CH 510 is operational and when the selected BH controls the PD.

Figure 5B:
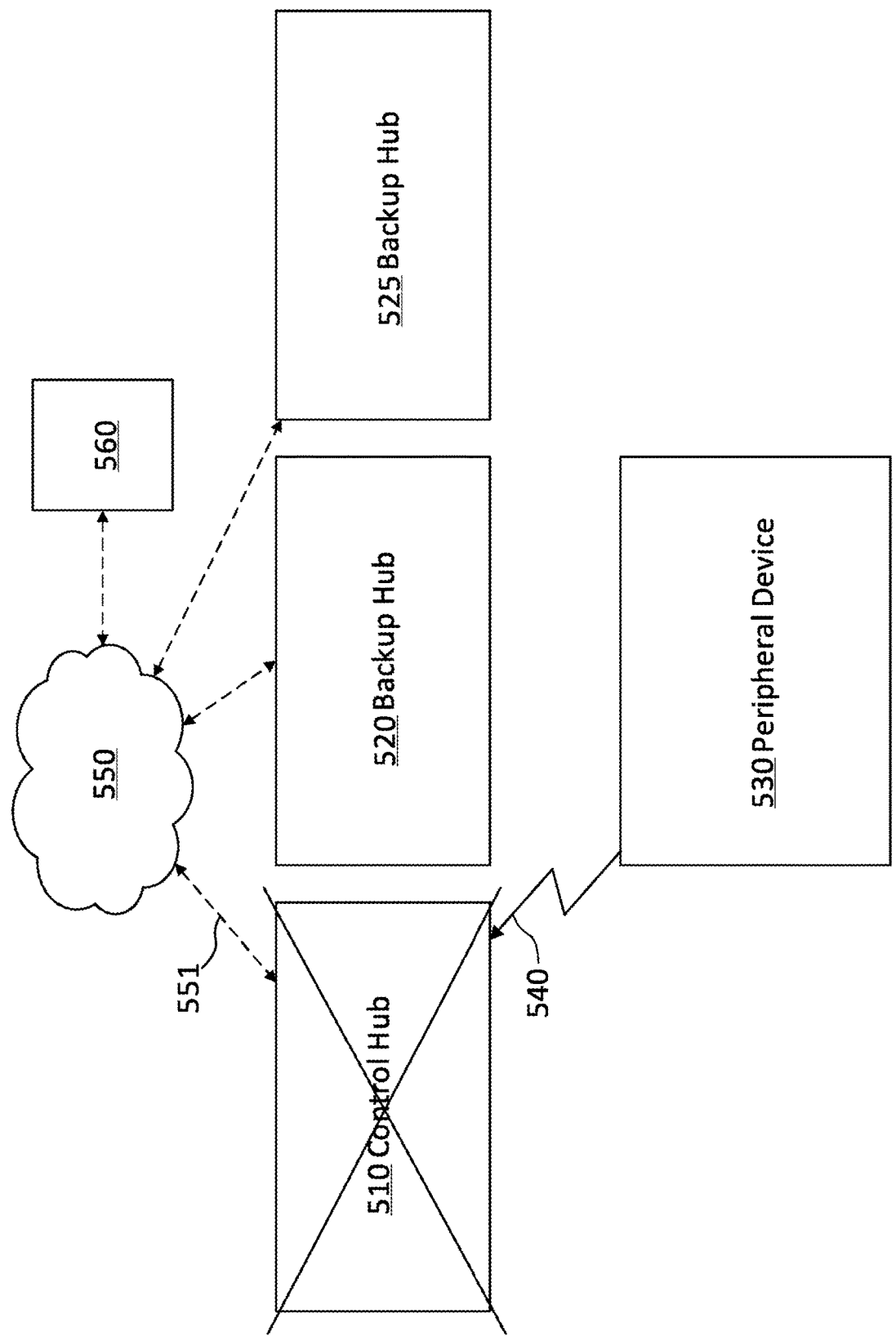

FIG. 5B depicts an embodiment where CH 510, which is the PD control hub, becomes non-operational. PD 530 transmits test signals 540 to CH 510, but CH 510 fails to send test response signals. In some embodiments, CH 510 also fails to communicate with server 550 via wired network connection 551.

Figure 5C:
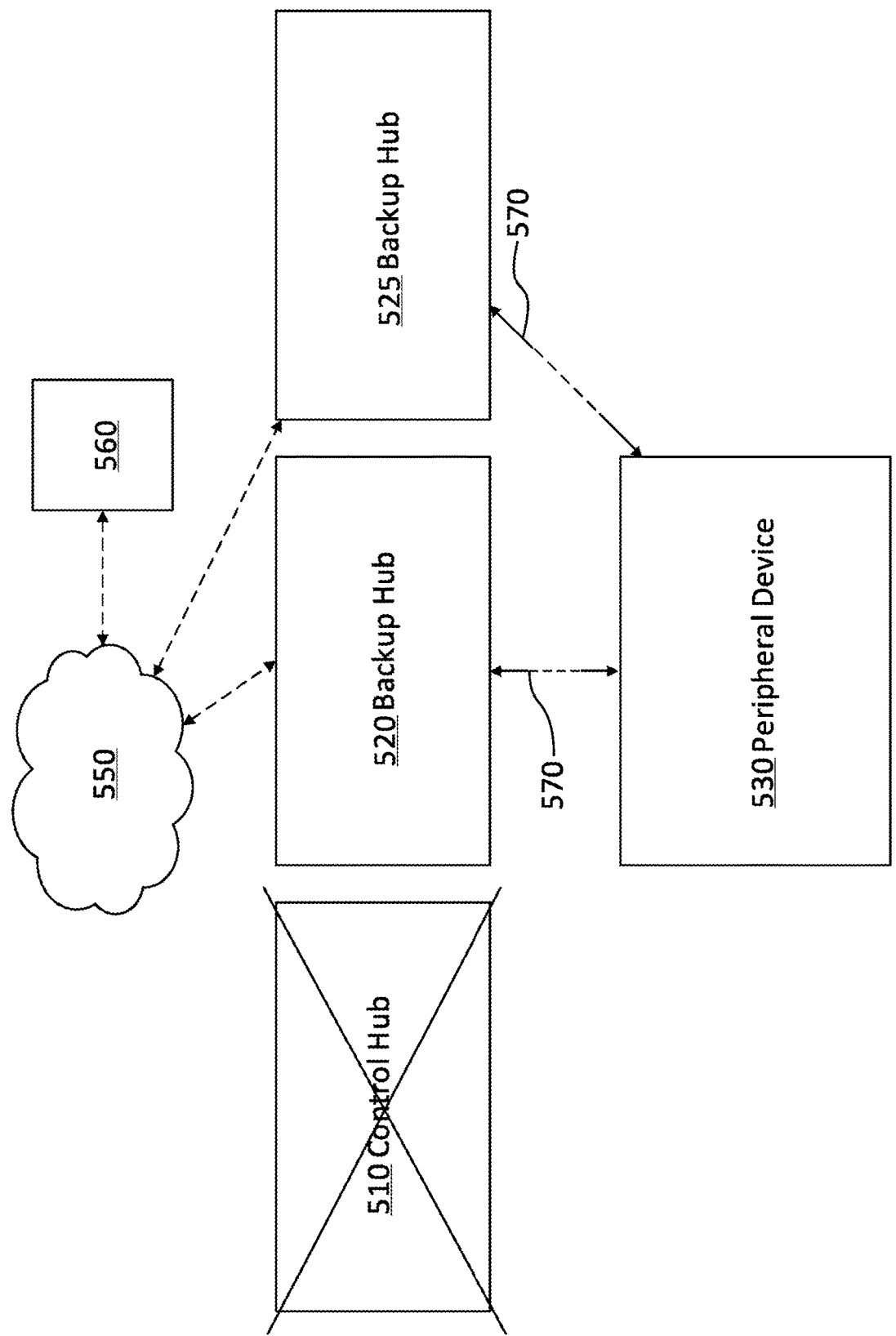
Figure 5D:
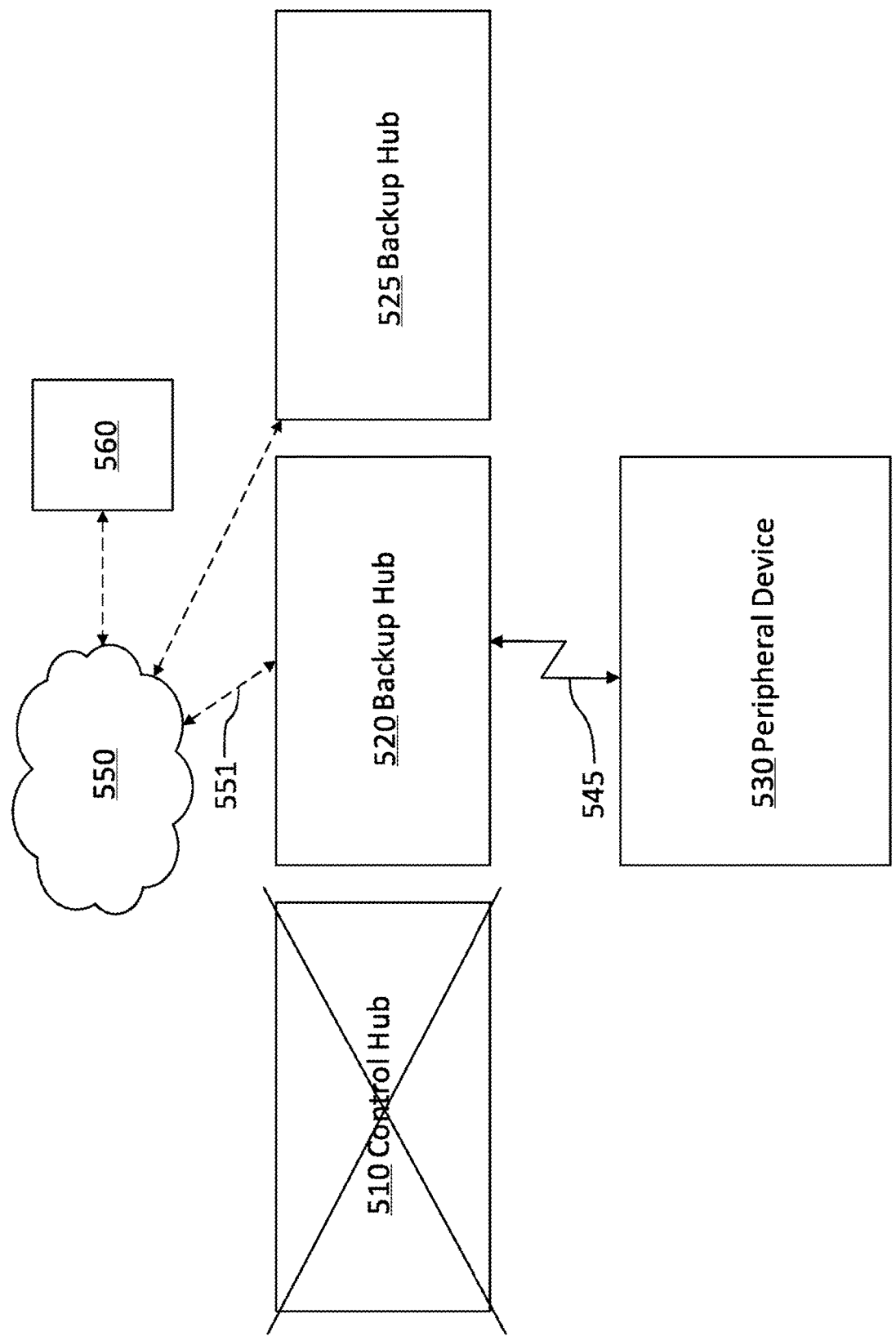

As seen in FIG. 5C, when the CH 510 fails to send the test response signal, PD 530 sends signal test signals 570 to BHs 520, 525. PD 520 selects one of BHs 520, 525 as the new PD control hub based on factors similar to those discussed above with regard to FIG. 4C. For example, as depicted in FIG. 5D, PD 530 selects BH 520 as the new PD control hub. When the system operation information is updated, BH 520 controls PD 530 via control signals 545. In one embodiment, BH 520 notifies sever 550, via wired network connection 551, that the test response signal is not received from CH 510 by PD 530, that BH 520 is selected by PD 530 to control PD 520, and BH 520 is designated in the system operation information to control PD 530. In one embodiment, the system operation information includes instructions that instruct server 550 to notify user device 560 that CH 510 is non-responsive, that PD 530 selected BH 520, and that BH 520 is designated as the new PD control device. In some embodiments, the system operation information includes instructions that instruct CH 510 to reacquire control of the PD 530 when CH 510 is operational and BH 520 controls PD 530.

FIGS. 6-9 below depict embodiments of redundant star networks 200, 300, 400, 500, further including additional PDs. The additional PDs, though not depicted explicitly, include similar hardware and software components as PDs 230, 330, 430, 530 described above. Thus, the additional PDs include, in some embodiments, the control hub test firmware and the update firmware. Additionally, in some embodiments, the additional PDs include the selecting firmware. Similarly, the CHs and BHs described below includes the hardware and software features of CHs and BHs discussed above.

Figure 6:
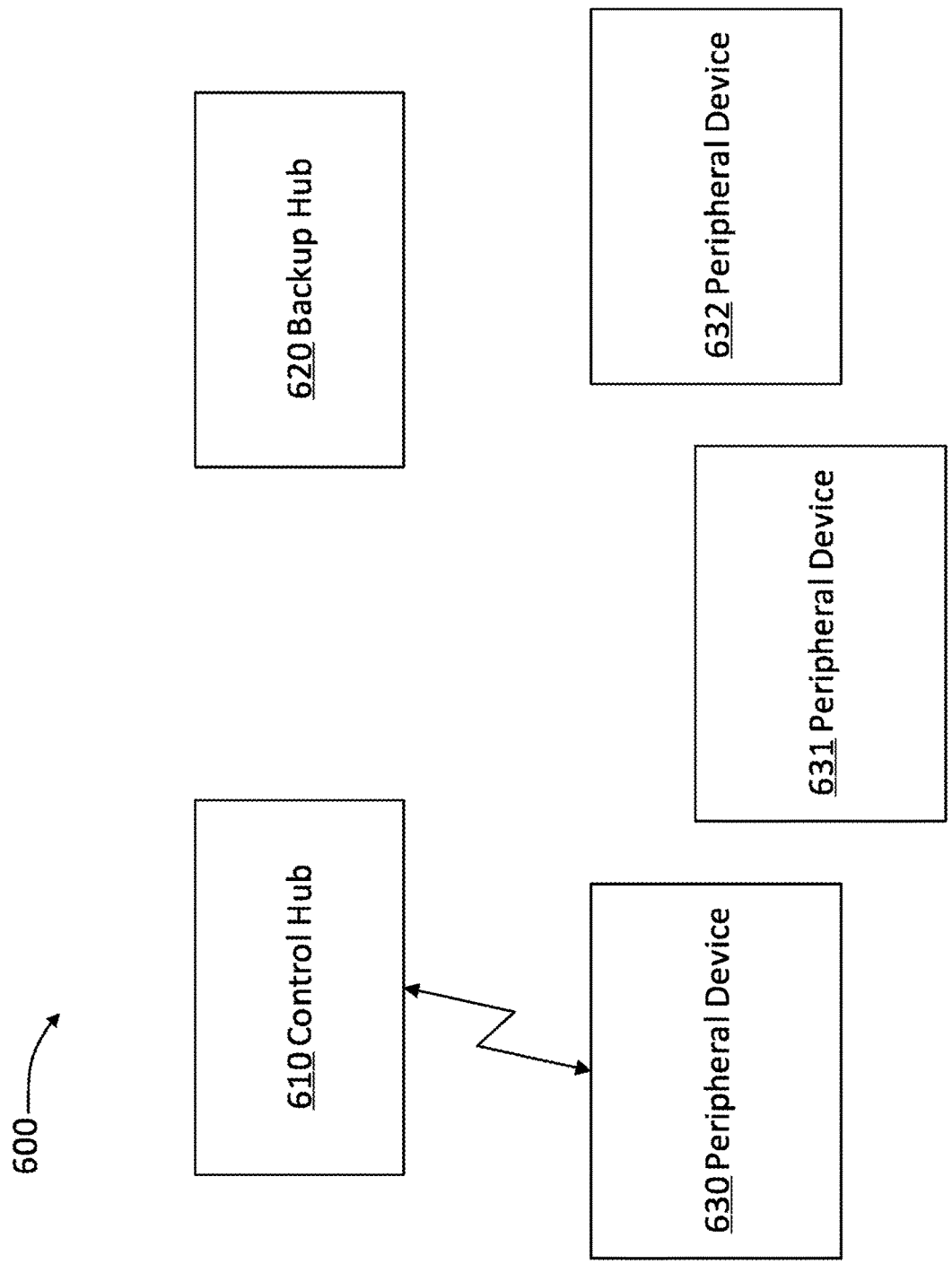
FIG. 6 depicts an embodiment of a redundant start network having multiple peripheral devices.

FIG. 6 depicts an embodiment of a redundant start network having multiple PDs. Network 600 includes CH 610, BH 620, and PDs 630, 631, 632. CH 610 controls PD 630. In some embodiments, CH 610 also controls PDs 631, 632 (though not shown). Alternatively, BH 620 controls one or more of PDs 631, 632 in some embodiments. A PD 630 microcontroller includes notification firmware that instructs PD 630 to notify PDs 631, 632 the test response is not received and BH 620 is designated for controlling PD 630. PDs 631, 632 each include similar programming for notifying other PDs when the PD control hub is switched. PDs 631, 632 also include the update firmware, and, in some embodiments, BH 620 controls PDs 631, 632 when CH 610 is not operational. In some embodiments, the system operation information includes instructions that instruct CH 610 to reacquire control of PDs 630, 631, 632 when the CH 610 is operational and BH 620 controls PDs 630, 631, 632.

Figure 7:
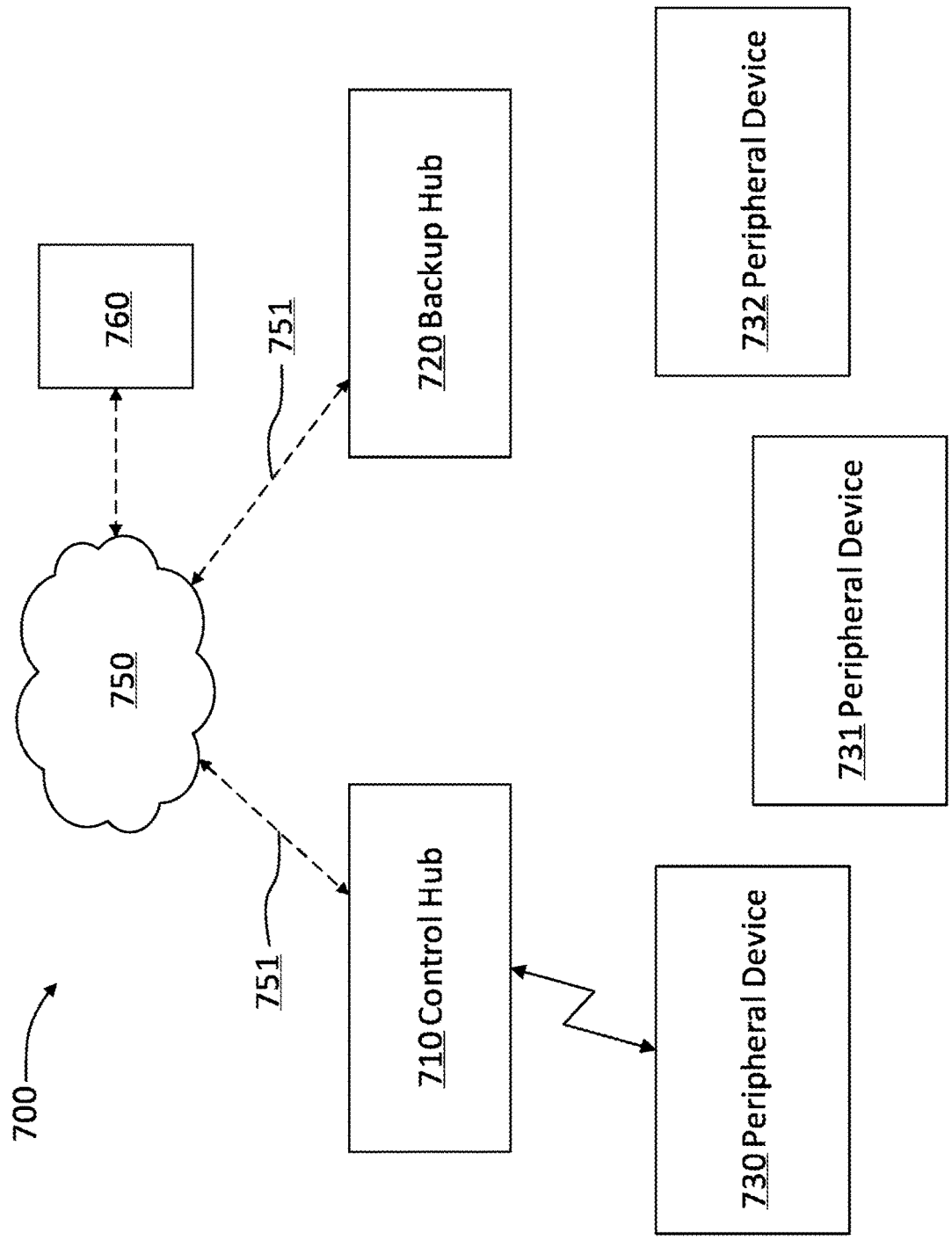
FIG. 7 depicts the redundant star network of FIG. 6 additionally networked to a cloud server.

FIG. 7 depicts the redundant star network of FIG. 6 additionally networked to a cloud server. Redundant star network 700 includes CH 710, BH 720, and PDs 730, 731, 732. Additionally, redundant star network 700 includes server 750 and user device 760. Server 750 is one among a cloud of servers, and is networked to CH 710 and/or BH 720 via wired network connection 751. Though not shown, server 710 includes hardware memory that stores the system operation information.

Figure 8:
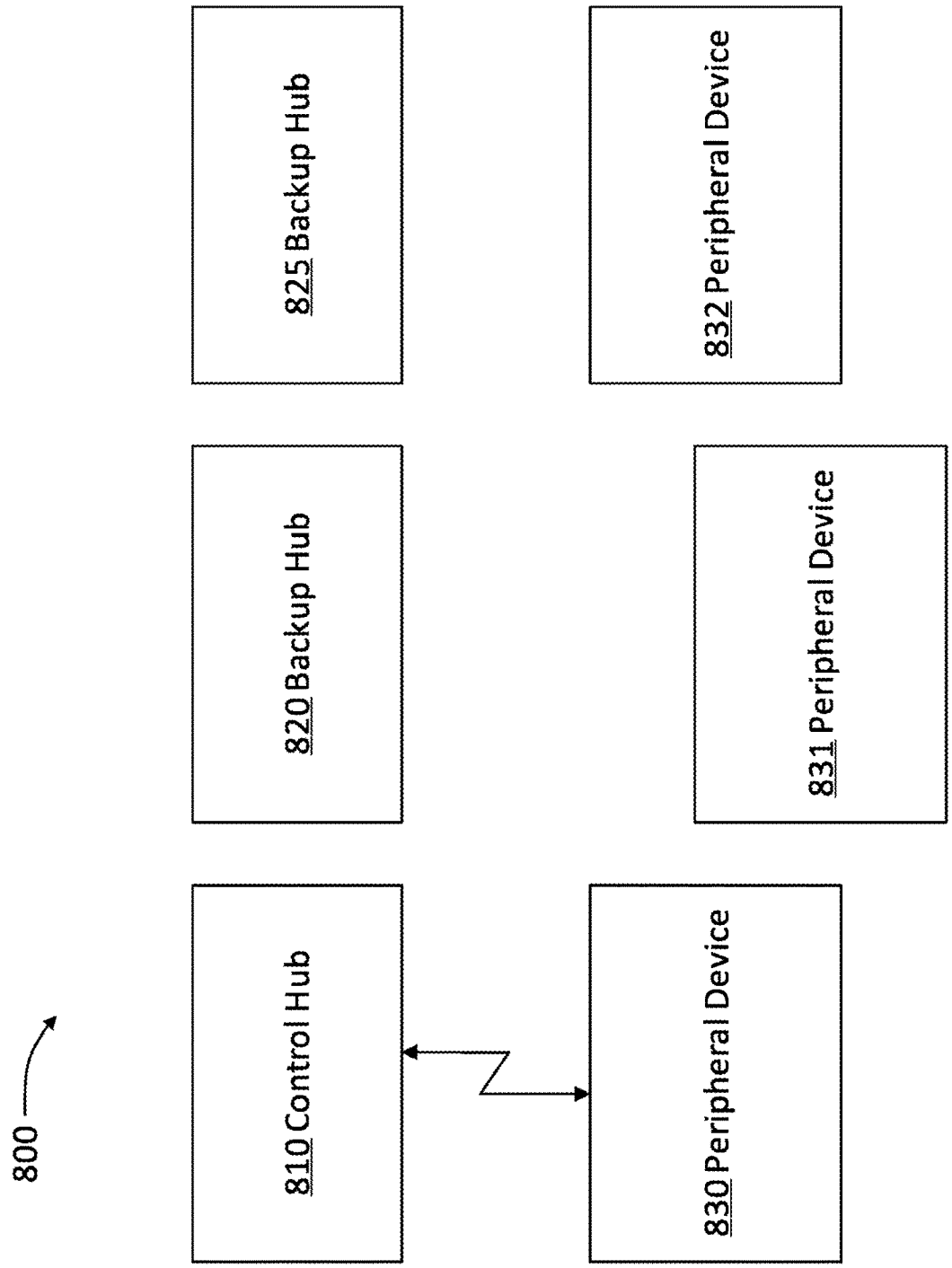
FIG. 8 depicts an embodiment of a redundant star network having multiple backup hubs and multiple peripheral devices.

FIG. 8 depicts an embodiment of a redundant star network having multiple backup hubs and multiple PDs. Redundant star network 800 includes CH 810, BHs 820, 830, and PDs 830, 831, 832. Though only three PDs are depicted, redundant star network 800 includes, in some embodiments, several PDs as described with regard to FIG. 1. Additionally, though only two BHs are depicted, in some embodiments, redundant start network 800 includes more than two BHs. CH 810 controls PD 830. In some embodiments, CH 810 also controls PDs 831, 832 (though not shown). Alternatively, one of BHs 820, 825 controls one or more of PDs 831, 832 in some embodiments. In some embodiments one BH controls one PD, and the other BH controls the other PD. For example, in one embodiment, CH 810 controls PD 830, BH 820 controls PD 831, and BH 825 controls PD 832. A PD 830 microcontroller includes notification firmware that instructs PD 630 to notify PDs 831, 832 the test response is not received from CH 810. The PD 830 microcontroller, and PDs 831, 832 microcontrollers, include test firmware for testing the BHs to determine which BH to designate as the new PD control hub. In some embodiments, each PD selects a different BH. In other embodiments, each PD selects the same BH. In yet other embodiments, some PDs select one BH, while other PDs select one or more other BHs. For example, in one embodiment, PDs 830, 831 select BH 820 as the new PD control hub, and PD 832 selects BH 825 as the new PD control hub. PDs 830, 831, 832 transmit instructions to the respective new PD control hub to update the system operation information with the respective designations.

Figure 9:
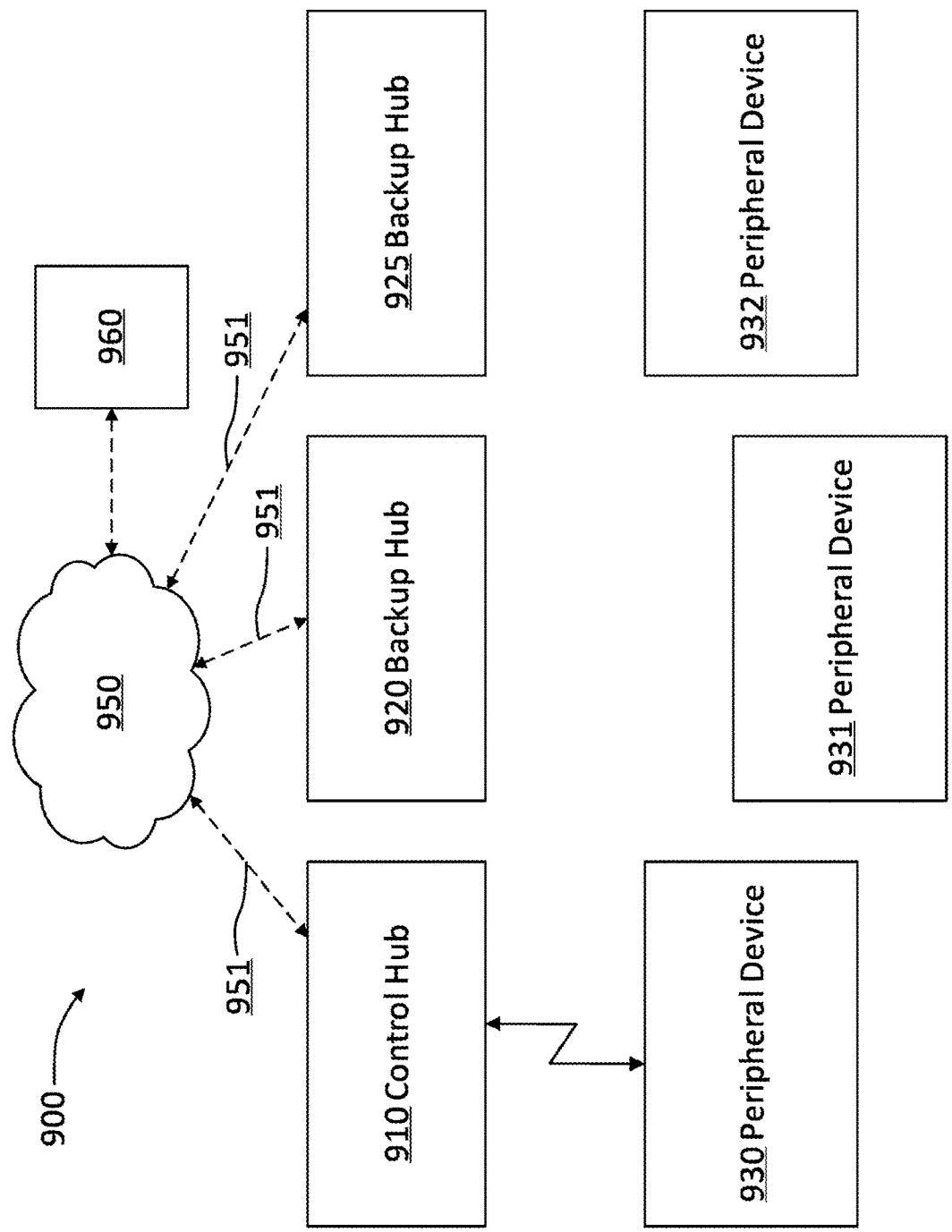
FIG. 9 depicts the redundant star network of FIG. 8 additionally networked to a cloud server.

FIG. 9 depicts the redundant star network of FIG. 8 additionally networked to a cloud server. Redundant star network 900 includes CH 910, BHs 920, 925, and PDs 930, 931, 932. Additionally, redundant star network 900 includes server 950 and user device 960. Server 950 is one among a cloud of servers, and is networked to CH 910 and/or one or more of BHs 920, 925 via wired network connection 951. Though not shown, server 910 includes hardware memory that stores the system operation information.

Figure 10:
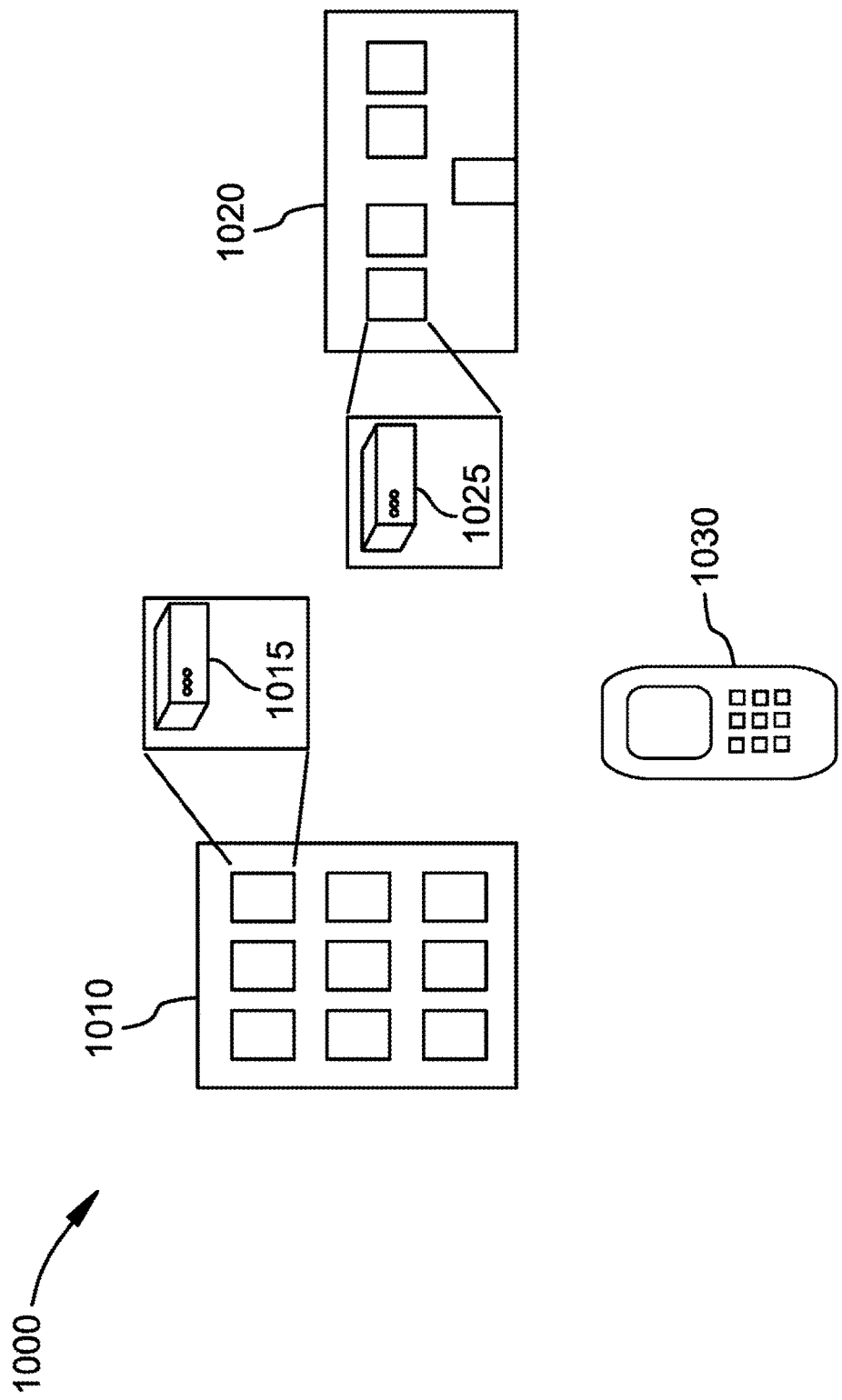
FIG. 10 depicts a specific embodiment of a redundant star network such as a network for a multi-building industrial complex.

FIG. 10 depicts a specific embodiment of a redundant star network such as a network for a multi-building industrial complex. Industrial complex 1000 includes building 1010, which houses network hub 1015, and building 1020, which houses network 1025. Industrial complex 1000 includes several mobile PDs that are transported around industrial complex 1000. In the present embodiment, the PD is handheld barcode scanner 1030 for tracking inventory. Scanner 1030 includes a long-range transceiver and microcontroller as described for PDs above. Network hubs 1015, 1025 store inventory location information for inventory located around industrial complex 1000.

In one example embodiment, a user requests to know, via scanner 1030, when certain inventory arrives at industrial complex 1000. Scanner 1030 transmits the request to network hub 1015, which updates the system operation information with the request. A user requests via scanner 1030 to know the location of the certain inventory. However, scanner 1030 is located outside network hub's 1015 range. Scanner 1030 tests network hub 1015 and does not receive a test response from network hub 1015. Scanner 1030 requests network hub 1025 take over control of scanner 1030 and respond to the request for the location of the certain inventory. Network hub 1025 transmits the location of the certain inventor to scanner 1030.

FIG. 11 depicts another specific embodiment of a redundant star network similar to FIG. 10. Industrial complex 1100 includes building 1110, which houses network hub 1115, building 1120, which houses network hub 1125, and building 1140, which houses network hub 1145. Industrial complex 1100 includes several mobile and stationary PDs. The present embodiment includes a stationary PD, access pad 1134, and a mobile PD, handheld barcode scanner 1150 for tracking inventory. Access pad 1134 controls access through perimeter fence 1130 via gate 1132. Access pad 1134 and scanner 1150 each include a long-range transceiver and microcontroller as described for PDs above.

In one example embodiment, access pad 1134 and scanner 1150 are controlled by network hub 1115. However, network hub 1115 is non-functional. Each of access pad 1134 and scanner 1150 test network hub 1115 for functionality and determine network hub 1115 is non-functional. Access pad 1134 and scanner 1150 transmit signal test signals to network hubs 1125, 1145 to select a new PD control hub. Access pad 1134 selects network hub 1125 as its new PD control hub, and scanner 1150 selects network hub 1145 as its new PD control hub. Access pad 1134 and scanner 1150 transmit to each corresponding new PD control hub the ne PD control hub designations. The new PD control hubs 1125, 1145 update the system operation information with the designations and control the PDs.

Figure 12A:
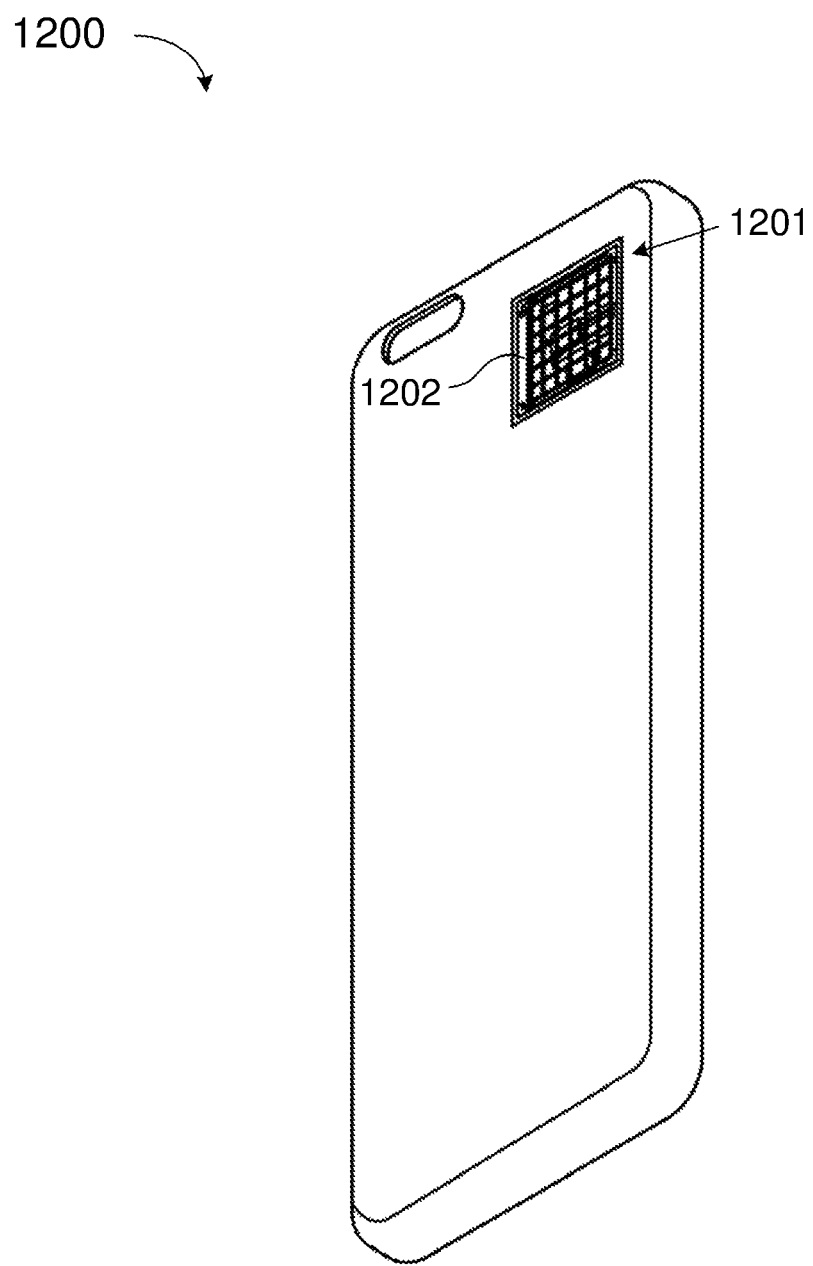
FIGS. 12A-C depict three views of an apparatus including a housing having a selectably RF transparent side.
Figure 12B:
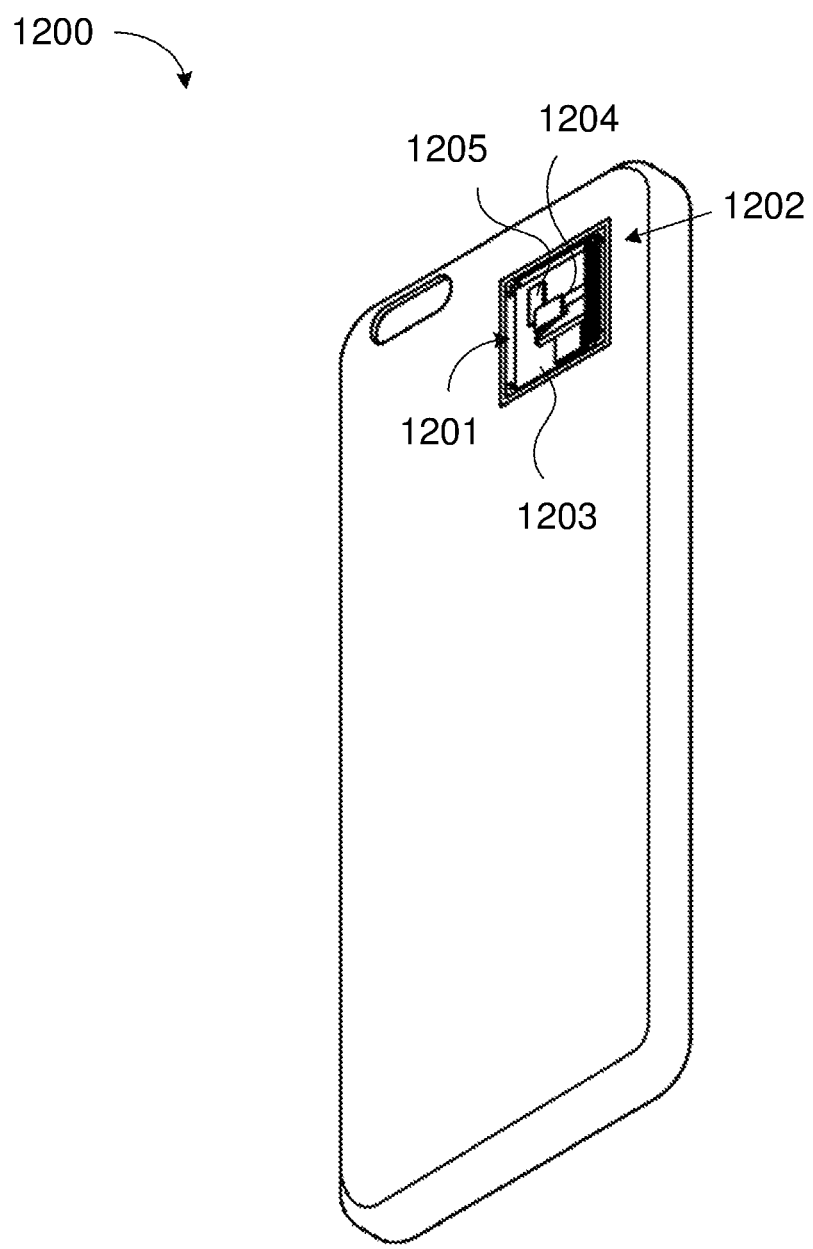
Figure 12C:
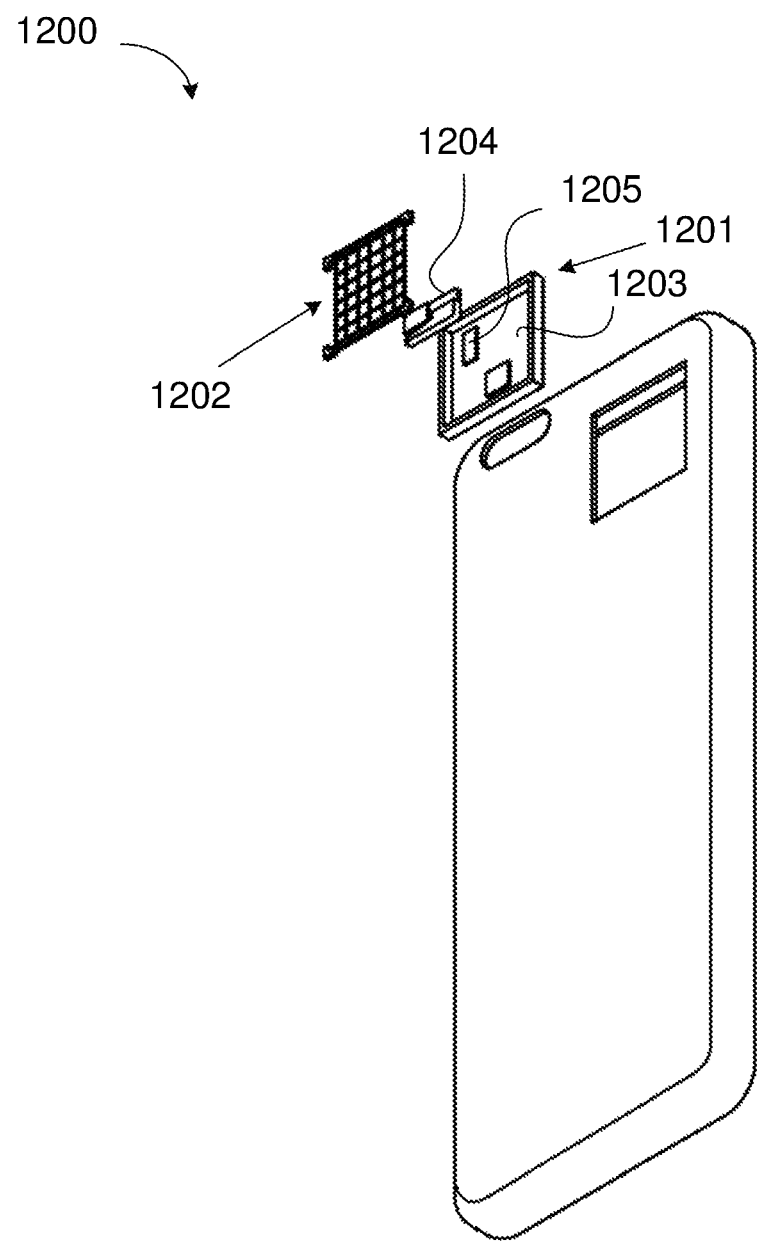

FIGS. 12A-C depict three views of an apparatus including a housing having a selectably RF transparent side, the selectable side. FIG. 12A shows the apparatus in an RF opaque configuration. FIG. 12B shows the apparatus in an RF transparent configuration. FIG. 12C is an exploded view. The apparatus 1200 includes a housing 1201 having a selectably RF transparent side 1202 and RF opaque sides 1203. An antenna 1204 and wireless transmitter 1205 are disposed within the housing 1201. The apparatus may convert the selectably RF transparent side 1202 from RF opaque to RF transparent. The wireless transmitter 1205 may then communicate information, via the antenna 1204, to the control hub or backup hub. The wireless transmitter 1205 may be tuned to be low range, such that the strength of the signal emitted by the antenna 1204 is less than or equal to negative 110 dBm at a distance greater than or equal to 12 inches from the transmitter 1205. The information communicated by the wireless transmitter 1205 may comprise a hash digest. The antenna 1204 may be a broadband microstrip antenna as disclosed in co-pending U.S. patent application Ser. No. 15/458,347, to Hall et al., entitled Broadband Microstrip Antenna, which is incorporated herein in its entirety for that it claims and teaches.

In various embodiments, the apparatus 1200 may also include an RF transparent pane disposed over the selectably RF transparent side 1202 of the housing 1201. The pane may be visually transparent, visually opaque, may be tinted to reduce light transmission, or may at least partially obscure light transmission. The pane may be comprised of a plastic material or glass. This may provide protection to the components of the selectably RF transparent side 1202.

The selectably RF transparent side is described in more detail below. The RF opaque sides 1203 of the housing 1201 may comprise one or more electrically conductive materials, such as metal or other equivalents. Additionally, one or more of the RF opaque sides 1203 of the housing 1201 may include interconnects that connect the wireless transmitter to the hardware processors, hardware memory, or both, of the apparatus 1900. The hardware processors, hardware memory, or both, may be disposed outside the housing 1201.

Figure 13:
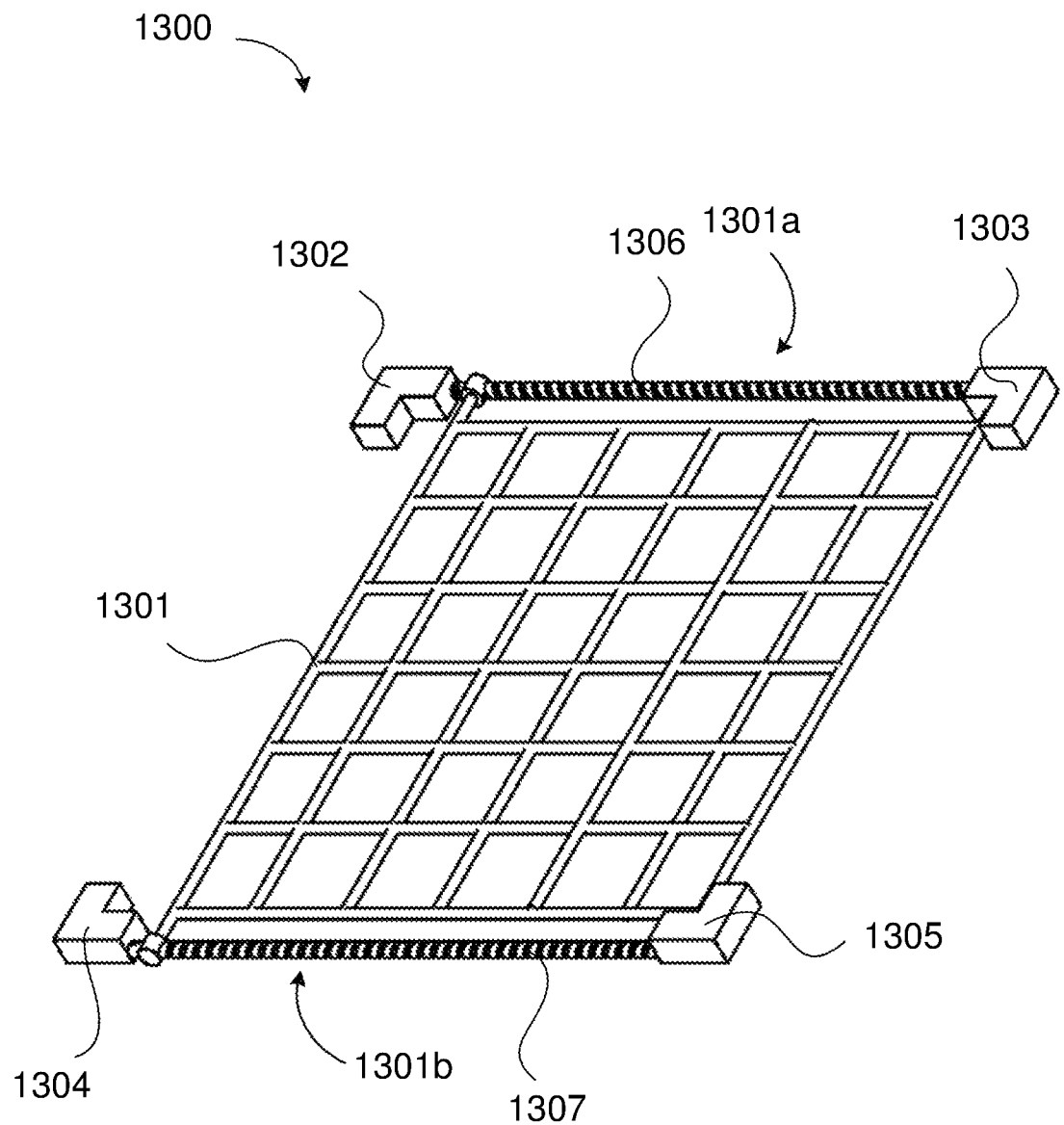
FIG. 13 depicts an embodiment of a housing comprising a selectably RF transparent side.

FIG. 13 depicts an embodiment of a selectably RF transparent side shown in, and described above regarding, FIGS. 12 A-C. The selectably RF transparent side 1300 includes a mesh 1301, a first brace 1302, a second brace 1303, a third brace 1304, a fourth brace 1305, a first worm gear 1306, and a second worm gear 1307. Disposed in the first or second brace 1302, 1303 is a first motor that drives the first worm gear 1306. Disposed in the third or fourth brace 1304, 1305 is a second motor that drives the second worm gear 1307. The motors may be powered via electronics disposed within the housing, our electronics outside the housing. For example, the motors may be controlled by hardware processors disposed outside the housing via interconnects through one or more of the RF opaque housing sides.

As shown, the mesh 1301 is fixed at a first side 1301a to the first worm gear 1306, and at a second side 1301b to the second worm gear 1307. The first and second sides 1301a, b are also depicted as being fixed to braces 1303, 1305, which may contain the first and second motors. However, the first and second sides 1301a,b may be fixed to at least one of the RF opaque sides of the housing.

All patents and published patent applications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. A system comprising:
a peripheral device, comprising:
    a peripheral device wireless long-range transceiver;
    a peripheral device microcontroller;
    peripheral device memory that stores peripheral device instructions that when executed by the peripheral device microcontroller cause the peripheral device microcontroller to:
        receive a first control instruction from a control hub via the peripheral device wireless long-range transceiver;
        send a test signal to the control hub via the peripheral device wireless long-range transceiver;
        listen for a test response signal from the control hub, wherein the test response signal indicates that the control hub is operational;
        determine that the control hub is not operational when the test response signal is not received within an expected response timeframe after the test signal is sent;
        identify a backup hub;
        transmit a second test signal to the backup hub via the peripheral device wireless long-range transceiver;
        receive a second test response signal from the backup hub via the peripheral device wireless long-range transceiver;
        select the backup hub based on the second test response signal;
        send a control hub switch signal to the backup hub via the peripheral device wireless long-range transceiver when the control hub is not operational, wherein the control hub switch signal instructs the backup hub to update system operation information to designate the backup hub for controlling the peripheral device; and
        receive a second control instruction from the backup hub via the peripheral device wireless long-range transceiver;
the control hub, comprising:
    a control hub wireless long-range transceiver;
    a control hub hardware processor;
    control hub hardware memory that stores first system operation information and control hub instructions, wherein the control hub instructions when executed by the control hub hardware processor cause the control hub hardware processor to:

control the peripheral device based on the first system operational information;
send the first control instruction to the peripheral device via the control hub wireless long-range transceiver;
the backup hub, comprising:
a backup hub wireless long-range transceiver;
a backup hub hardware processor; and
backup hub hardware memory that stores second system operation information and backup hub instructions, wherein the backup hub instructions when executed by the backup hub hardware processor cause the backup hub hardware processor to:
receive the second test signal from the peripheral device via the backup hub wireless long-range transceiver;
transmit the second test response signal to the peripheral device via the backup hub wireless long-range transceiver;
receive the control hub switch signal via the backup hub wireless long-range transceiver;
update the second system operation information to designate the backup hub for controlling the peripheral device;
control the peripheral device based on the second system operation information; and
send the second control instruction to the peripheral device via the backup hub wireless long-range transceiver.

2. The system of claim 1, further comprising a server, wherein the server is one among a cloud of servers, wherein the server is networked to the control hub and the backup hub via a wired network connection, and wherein the server comprises hardware memory that stores the control instructions for the peripheral device.

3. The system of claim 2, wherein the backup hub operating instructions includes instructions that instruct the backup hub to notify the server that the test response signal was not received, and that the backup hub is controlling the peripheral device.

4. The system of claim 3, wherein the server hardware memory stores instructions that instruct the server to notify a user that the control hub is not operational, and that the backup hub is controlling the peripheral device.

5. The system of claim 1, wherein the control hub operating instructions further comprises instructions that instruct the control hub to reacquire control of the peripheral device when the control hub is operational and when the backup hub controls the peripheral device.

6. The system of claim 1, further comprising one or more additional peripheral devices, wherein the additional peripheral devices each include an additional peripheral wireless long-range transceiver and an additional peripheral device microcontroller, and wherein the control hub controls the additional peripheral devices.

7. The system of claim 6, wherein the peripheral device instructions comprises notification instructions that instruct the peripheral device to notify the additional peripheral devices that the control hub is not operational, and that the backup hub is controlling the peripheral device.

8. The system of claim 7, wherein the backup hub receives a control hub switch signal from each of the additional peripheral devices, and wherein the backup hub controls each of the additional peripheral devices in response to the control hub switch signal from each of the additional peripheral devices.

9. The system of claim 1, wherein the peripheral device instructions comprise instructions for communicating with at least one of the control hub and the backup hub using long range spread spectrum signals, narrowband frequency shift keying signals, or both.

10. A system comprising:
a control hub;
at least two backup hubs;
a peripheral device, comprising:
a wireless long-range transceiver;
a microcontroller; and
memory that stores instructions that when executed by the microcontroller cause the microcontroller to:
send a first test signal to the control hub via the wireless long-range transceiver;
listen for a first test response signal from the control hub, wherein the first test response signal is transmitted by the control hub in response to the first test signal when the control hub is operational, and wherein the first test response signal indicates that the control hub is operational;
determine that the control hub is not operational when the first test response signal is not received within an expected response timeframe after the test signal is sent;
identify each of the at least two backup hubs;
send a second test signal to each of the at least two backup hubs via the wireless long-range transceiver when the control hub is not operational;
receive a second test response from each of the at least two backup hubs via the wireless long-range transceiver in response to the second test signal;
determine at least one of a received signal strength, a time of flight between the peripheral device and a respective backup hub, or both for each of the at least two backup hubs based on the received second test response from each of the at least two backup hubs;
select a backup hub from the at least two backup hubs based on the received signal strength, the time of flight between the peripheral device and the respective backup hub, or both;
send a control hub switch signal to the selected backup hub via the wireless long-range transceiver when the control hub is not operational, wherein the control hub switch signal instructs the selected backup hub to update system operation information to designate the selected backup hub for controlling the peripheral device; and
receive a second control instruction from the selected backup hub via the wireless long-range transceiver.

11. The system of claim 10, further comprising a server, wherein the server is one among a cloud of servers, wherein the server is networked to the control hub and each of the at least two backup hubs via a wired network connection.

12. The system of claim 11, wherein the selected backup hub comprises a processor and memory that stores backup hub operating instructions that when executed by the processor cause the processor to notify the server that the first test response signal was not received, and that the selected backup hub is controlling the peripheral device.

13. The system of claim 12, wherein the server comprises a processor and memory that stores server instructions that when executed by the processor cause the processor to notify a user that the control hub is not operational, and that the selected backup hub is controlling the peripheral device.

14. The system of claim 10, wherein the control hub comprises a processor and memory that stores control hub instructions that when executed by the processor cause the processor to reacquire control of the peripheral device when the control hub is operational and when the selected backup hub controls the peripheral device.

15. The system of claim 10, further comprising one or more additional peripheral devices, wherein the additional peripheral devices each include a wireless long range transceiver and a microcontroller, and wherein the control hub controls the additional peripheral devices.

16. The system of claim 15, wherein the instructions are further executable by the microcontroller to notify the additional peripheral devices that the control hub is not operational, and that the selected backup hub is controlling the peripheral device.

17. The system of claim 16, wherein the selected backup hub receives a control hub switch signal from each of the additional peripheral devices, and wherein the selected backup hub controls each of the additional peripheral devices in response to the control hub switch signal from each of the additional peripheral devices.

18. The system of claim 10, wherein the instructions are further executable by the microcontroller to communicate with at least one of the control hub and the selected backup hub using long range spread spectrum signals, narrowband frequency shift keying signals, or both.

\* \* \* \* \*